United States Patent
Tai et al.

(10) Patent No.: US 6,587,267 B2
(45) Date of Patent: Jul. 1, 2003

(54) BEAM DIRECTING DEVICE

(75) Inventors: Kuochou Tai, Fremont, CA (US); Kok-Wai Chang, Los Altos, CA (US); Jyehong Chen, Mt. Holly, NJ (US); Qing Dong Guo, Sunnyvale, CA (US)

(73) Assignee: JDS Uniphase Inc., Ottawa (CA)

( * ) Notice: Subject to any disclaimer, the term of this patent is extended or adjusted under 35 U.S.C. 154(b) by 6 days.

(21) Appl. No.: 09/986,530

(22) Filed: Nov. 9, 2001

(65) Prior Publication Data

US 2003/0090796 A1 May 15, 2003

(51) Int. Cl.[7] .............................................. G02B 27/28
(52) U.S. Cl. .................. 359/484; 359/497; 359/498; 359/122; 359/124; 359/127
(58) Field of Search ................................. 359/484, 494, 359/495, 496, 497, 498

(56) References Cited

U.S. PATENT DOCUMENTS

| 4,566,761 A | 1/1986 | Carlsen et al. | |
|---|---|---|---|
| 4,643,519 A | 2/1987 | Bussard et al. | |
| 4,685,773 A | 8/1987 | Carlsen et al. | |
| 4,744,618 A | 5/1988 | Mahlein | |
| 5,414,548 A | 5/1995 | Tachikawa et al. | 359/130 |
| 5,694,233 A | 12/1997 | Wu et al. | 359/117 |
| 5,825,520 A | 10/1998 | Huber | 359/130 |
| 5,841,919 A | 11/1998 | Akiba et al. | 385/37 |
| 5,909,310 A | 6/1999 | Li et al. | 359/484 |
| 5,930,039 A | 7/1999 | Li et al. | 359/484 |
| 6,282,025 B1 * | 8/2001 | Huang et al. | 359/495 |
| 6,342,968 B1 * | 1/2002 | Tai et al. | 359/494 |
| 6,400,508 B1 * | 6/2002 | Liu | 359/495 |
| 6,438,278 B1 * | 8/2002 | Liu et al. | 385/11 |
| 6,538,815 * | 3/2003 | Cao | 359/484 |
| 2002/0003651 A1 * | 1/2002 | Sui | 359/280 |
| 2002/0009254 A1 * | 1/2002 | Sui | 385/16 |
| 2002/0186914 A1 * | 12/2002 | Li | 385/11 |
| 2003/0007244 A1 * | 1/2003 | Liu et al. | 359/484 |

* cited by examiner

*Primary Examiner*—John Juba
(74) *Attorney, Agent, or Firm*—Lacasse & Associates, LLC

(57) ABSTRACT

Described are various optical devices having at least two optical waveguides for inputting and outputting optical beams coupled thereto by a single collimating lens. Located proximate to the lens is a polarization dependent beam directing device that deflects orthogonally polarized optical beams in opposite directions by a first and second angle, respectively, when the beams are propagating in the same direction. The polarization dependent beam director compensates for an angle between a first beam input via a first of the two waveguides and a second beam input via a second of the two waveguides. The polarization dependent beam director also deflects a first beam propagating towards the waveguides in a first direction so that it is output via the first of the two waveguides and deflects a second beam propagating towards the waveguides in a second direction opposite the first so that it is output via the second of the two waveguides. Disclosed are three and four port interleavers and a four port circulator.

10 Claims, 16 Drawing Sheets

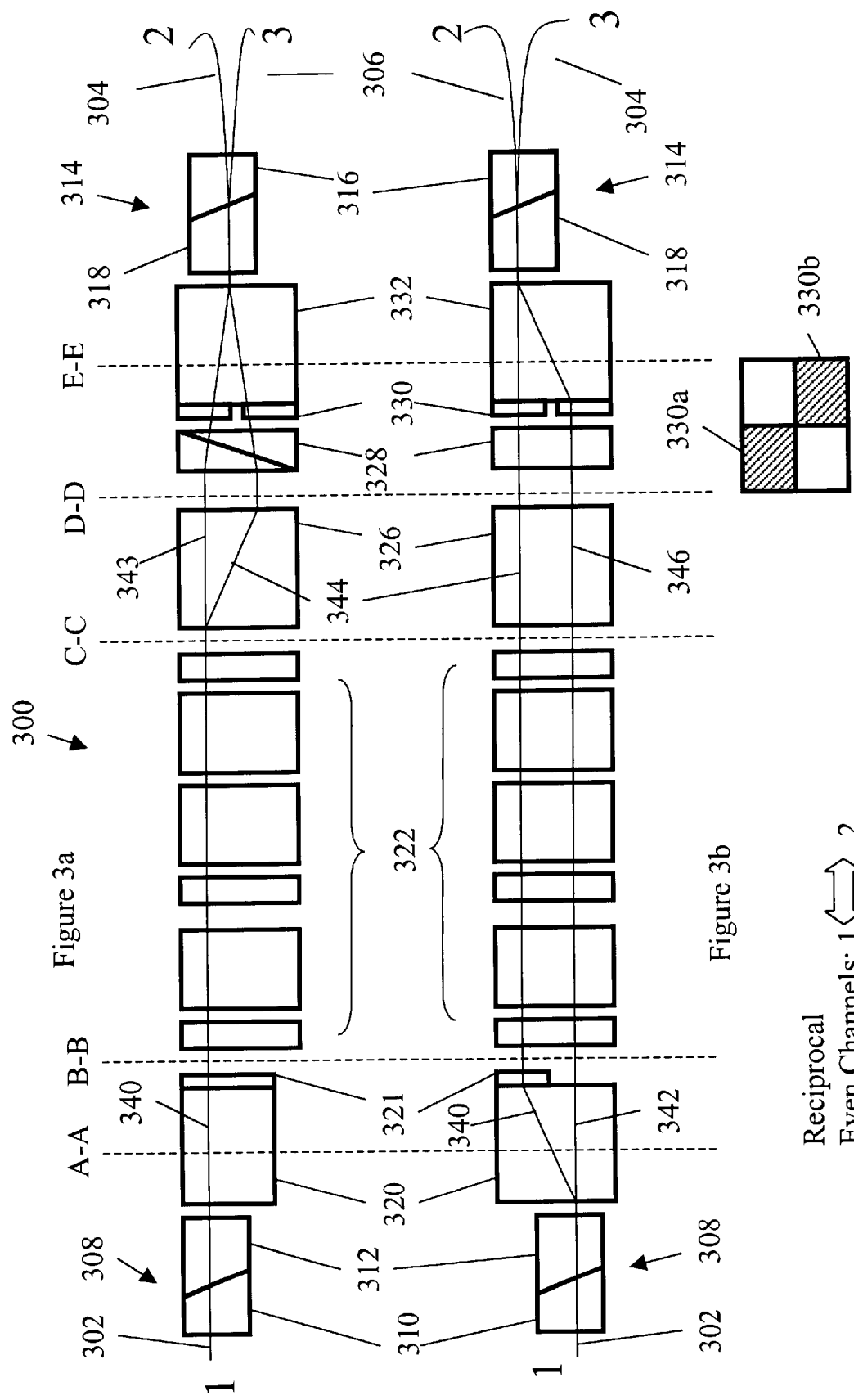

Non Reciprocal
Even 2-1-3
Odd 3-1-2

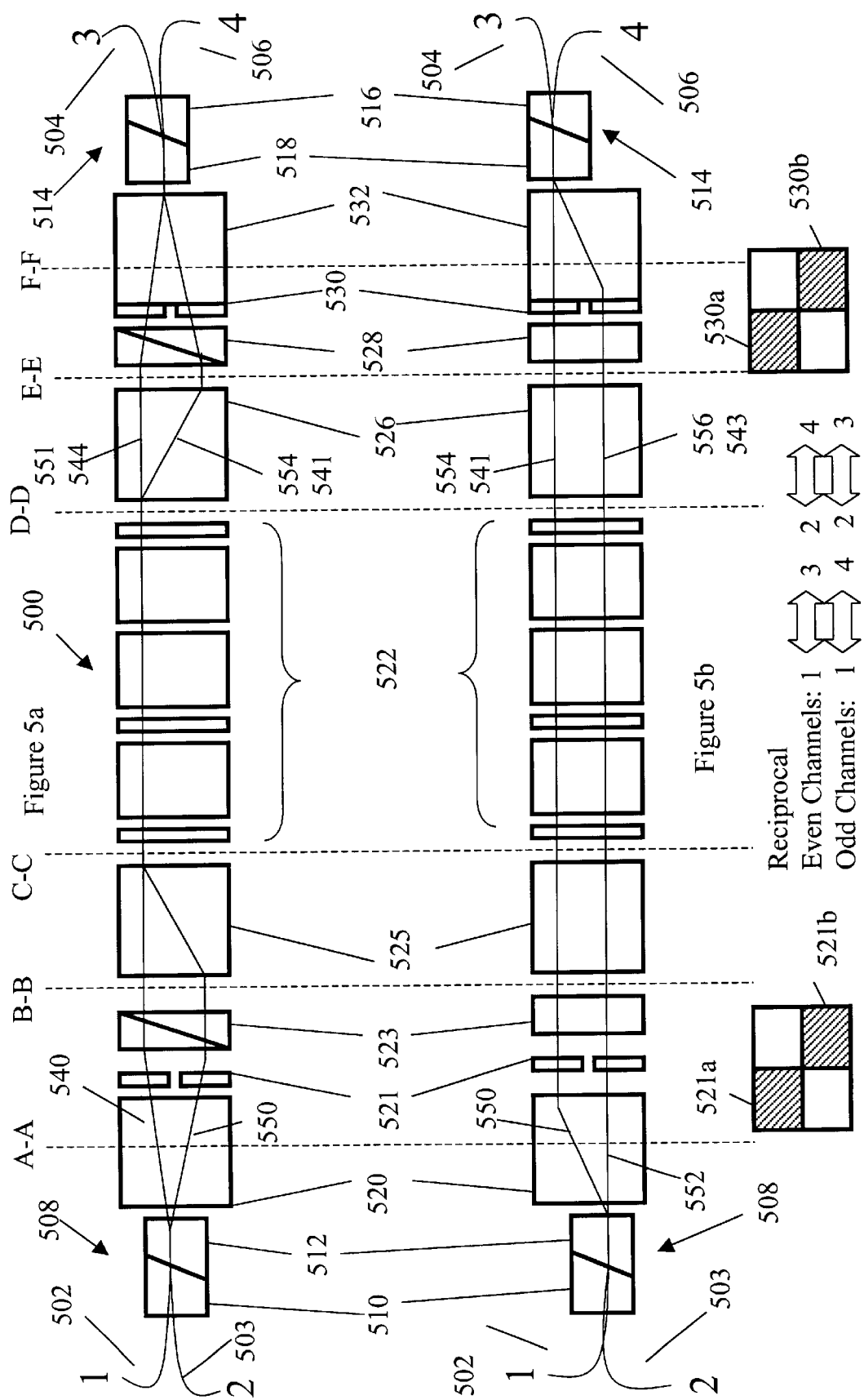

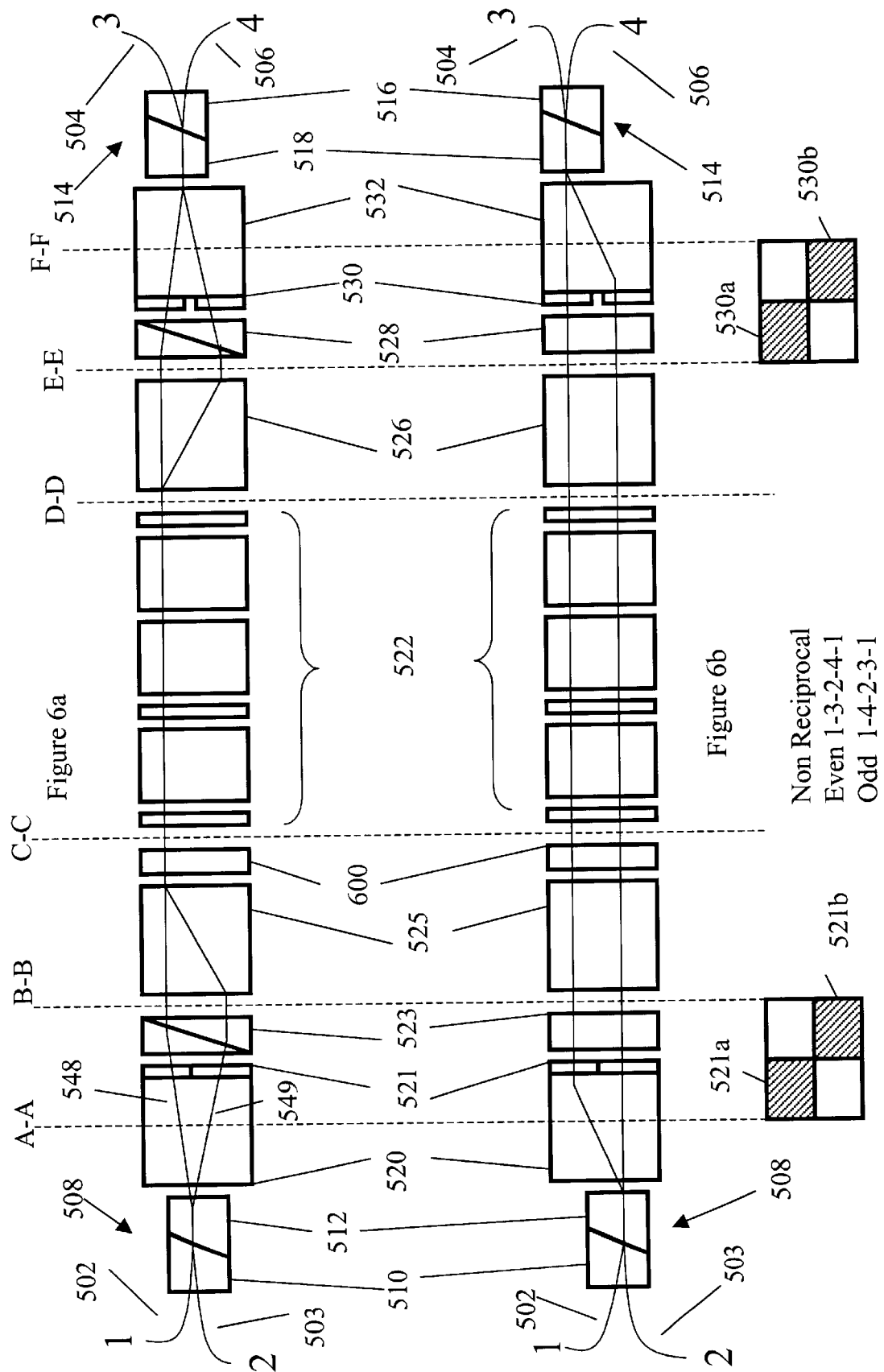

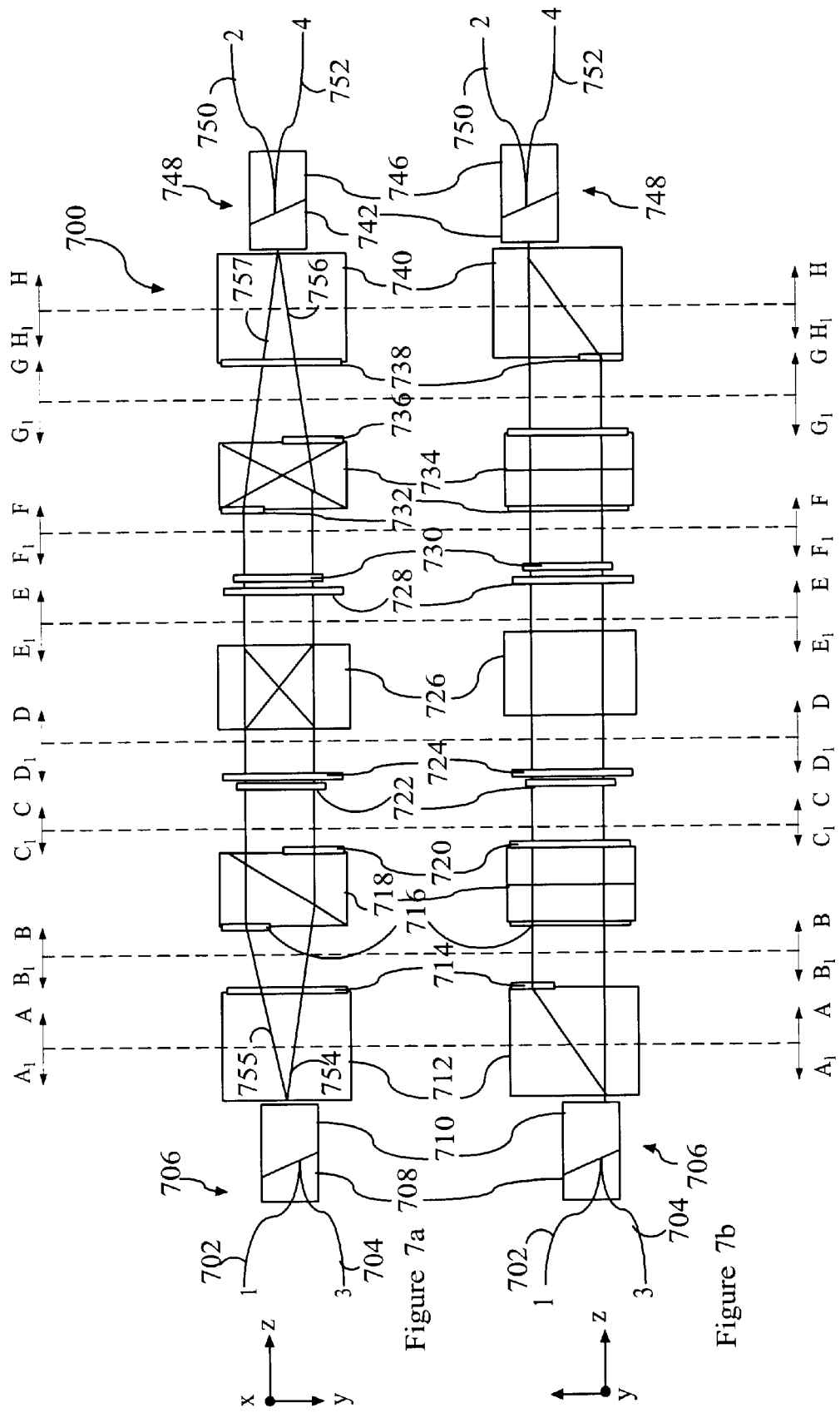

BEAM DIRECTING DEVICE

BACKGROUND OF THE INVENTION

1. Field of Invention

The present invention relates generally to the field of optical devices. More specifically, the present invention is related to a beam directing device for directing beams of light to and from two optical waveguides encased in a single ferrule, which is coupled to an optical device via a single collimating lens.

2. Discussion of Related Art

Optical fiber ("fiber") has been widely utilized as a transmission medium for telephony service providers for a number of years, as well as for metropolitan area networks (MAN) in many environments. In recent years, fiber has come into more widespread use in local loop plants, local area networks (LAN), in addition to finding an increased use at the edge of many networks. Further, fiber is expected to continue to penetrate many aspects of telecommunications, including many access-type networks, such as so-called fiber to the home (FTTH) and so-called fiber to the desktop (FTTPC).

The penetration of fiber continues because it advantageously provides for greater capacity and bandwidth. New services (e.g., Internet, high-speed data, video, audio, etc.) and the demands for these services, however, has significantly impacted bandwidth needs and has generated a desire for greater bandwidth capabilities than those available from legacy optical communications networks. Generally, there are two solutions to this increased bandwidth need. The first solution is to install more fiber to support the additional bandwidth. Depending upon the circumstances, however, this solution becomes cost prohibitive, and instead, the second solution of increasing the transportable bandwidth of existing fiber is pursued.

One method of increasing the transportable bandwidth of fiber is wavelength division multiplexing (WDM). WDM is an optical technology that combines two or more wavelengths of light, known as carriers or channels, for transmission along a single fiber. Each channel represents a bit stream that is carried over the corresponding wavelength, and different services or bit rates may be utilized for a given channel. This effectively increases the aggregate bandwidth of the fiber. For example, if 40 wavelengths, each capable of 10 Gb/s are used on a single fiber, the aggregate bandwidth of the fiber becomes 400 Gb/s.

There has additionally been another method of increasing transportable bandwidth, termed dense wavelength division multiplexing (DWDM). DWDM generally involves combining a denser number of wavelengths (>40) onto a fiber than WDM. While DWDM deals with more difficult issues associated with multiplexing a larger number of wavelengths on a fiber, such as cross-talk and non-linear effects, WDM and DWDM are typically used interchangeably.

Both of these technologies utilize optical devices based on the properties of light in both free space and in transparent materials. Examples of these devices include optical transmitters, optical receivers, optical filters, optical modulators, optical amplifiers, optical multiplexors/demultiplexors and optical circulators. To perform their functionality, many of these devices receive or output multiple, separate WDM beams via three or more different fibers. These fibers are coupled to the device through spatially separated input/output ports, which typically have optics for conditioning the optical beam prior to injection into the device. It is disadvantageous, however, to have spatially separated input/output ports for each fiber, as this increases the bulk of the device, when there is a desire for more compact devices. Yet, to provide the appropriate overall processing, these beams must be kept spatially separated during at least part of their processing, so as to be processed by some independent optical components of the device.

One such device that receives or outputs multiple, separate WDM beams via three or more different fibers is an interleaver/deinterleaver ("interleaver"). An interleaver is a type of optical multiplexor which, when operating as an interleaver, combines subsets of channels from different fibers into a single optical beam. When operating as a deinterleaver, the interleaver separates a single optical beam having a series of channels into two or more subset series of channels. Typically, an interleaver is used to separate or combine even and odd International Telecommunications Union (ITU) channels.

FIG. 1 conceptually illustrates the function of an interleaver. When operating as an interleaver, the interleaver receives a first optical beam 100, which comprises a number of even channels at frequencies $f_2$, $f_4$, $f_6$. The frequencies of each channel are such that each of these channels are separated by the same amount, e.g. 200 GHz. The interleaver also receives a second optical beam 102, which comprises a number of odd channels at frequencies $f_1$, $f_3$, $f_5$. Similar to beam 100, the frequencies of each of these channels are such that these channels are separated by the same amount, e.g. 200 GHz. The even and odd channels, however, are offset from each other, normally an amount equal to half their separation distances, e.g. 100 GHz. The interleaver then interleaves the beams 100 and 102 to generate a beam 104 having with the channels $f_1$, $f_2$, $f_3$, $f_4$, $f_5$, $f_6$, which are separated by 100 GHz. When operated as a deinterleaver, beam 104 is received and divided into beams 100 and 102.

Various techniques have been developed to accomplish multiplexing and interleaving. For example, diffraction grating methods, utilize a series of parallel grooves to diffract different wavelengths of light at different angles (U.S. Pat. No. 4,643,519 to Bussard et al. (International Telephone and Telegraph Corporation, Feb. 17, 1987) and U.S. Pat. No. 4,744,618 to Mahlein (Siemens Aktiengesellschaft, May 17, 1988)). Arrays of planar waveguides (AWG) direct an input multi-wavelength beam into multiple curved waveguides. The waveguides have slightly different lengths, so that the light takes different times to pass through each waveguide (U.S. Pat. No. 5,414,548 to Tachikawa et al. (Nippon Telegraph and Telephone Corporation, May 9, 1995) and U.S. Pat. No. 5,841,919 to Akiba et al. (Hitachi Cable, Ltd., Nov. 24, 1998)). One method utilizes fiber gratings that are optical fibers in which the refractive index varies regularly along their length. The variations scatter light (Bragg effect), and a narrow range of wavelengths can be selected (U.S. Pat. No. 5,825,520 to Huber (Oct. 20, 1998)).

Another technique involves the use of optical birefringent elements. Birefringent materials differ from other transparent materials in that they have different indices of refraction in different directions. Thus ordinary and extraordinary rays travel at different velocities through the birefringent material. Use of such birefringent elements has been described in U.S. Pat. No. 4,566,761 to Carlsen et al. (GTE Laboratories Inc.) issued Jan. 28, 1986, and U.S. Pat. No. 4,685,773 issued Aug. 11, 1987, a continuation-in-part thereof. Carlsen et al. used a single birefringent element between two polarizing beam splitters to make a polarization insensitive wavelength multiplexer/demultiplexer that is useful in fiber optic systems. They first split the input beam into two orthogonal plane polarized components that are passed in parallel through the birefringent element and then are recombined in the second polarizing beam splitter to provide two output beams consisting of the input light separated according to wavelength. This interleaver suffers from the disadvantage that it requires two spatially separated optical paths, and the output ports are perpendicular. This means that the interleaver will be bulky when a more compact size is desirable.

U.S. Pat. No. 5,694,233 to Wu et al. (Macro-Vision Communications, LLC) issued Dec. 2, 1997, describes a switchable wavelength device which functions both as a router and as a demultiplexer. A router is a device that spatially separates input optical channels into output ports and permutes these channels according to control beams to a desired coupling between an input channel and an output port. The device described has a series of birefringent elements, polarization rotators, and wavelength filters which together function to split an incoming beam into divided optical beams comprising a subset of the channels and spatially positions the divided optical beams in response to a control beam applied to the router. In this case, the output ports are parallel. However, the output ports are spatially separated, meaning that the interleaver will be bulky. Such an interleaver will also be expensive, since the cost increases with the size and number of components.

Circulators are another example of a device that receives or outputs multiple, separate WDM beams via three or more different fibers, and which it is advantageous to not have spatially separate input/output ports for each fiber. Circulators are non-reciprocal optical devices that sequentially direct light from one port to another. For instance, in a three port circulator, light entering the first port leaves via the second port, however, light entering the second port does not leave via the first port, but rather, leaves via a third port. In closed circulators light entering the third port leaves via the first port, while in open circulators, light entering the third port is extinguished within the circulator. Examples of circulators known in the art are described in U.S. Pat. No. 5,909,310 to Li et al. (Jun. 1, 1999) and U.S. Pat. No. 5,930,039 to Li et al. (Jul. 27, 1999).

A more compact three-port optical circulator is described in U.S. Pat. Nos. 5,909,310 and 5,930,039. The optical circulator is made more compact by allowing a single lens to be used for collimating the light from the first and third fibers. A single lens can be used because the light coupled to the first and third fibers is not parallel; rather there is a slight angle between the two beams. A polarization dependent light-bending device is then used to compensate for the angle between the beams. While Li et al. allow for a more compact three-port circulator, the manner in which the polarization dependent light-bending device is used does not provide for a four-port circulator. Furthermore, Li et al. do not teach the use of the polarization light-bending device in a manner providing for a more compact interleaver/deinterleaver.

Whatever the precise merits, features and advantages of the above cited references, none of them achieve or fulfills the purposes of the present invention.

SUMMARY OF THE INVENTION

Accordingly, the present invention relates to an optical component for directing signals between a first port and a first path, and for directing signals between a second port and a second path, wherein the first and second paths are parallel, and wherein the first and second ports are positioned between said first and second paths, the optical component comprising:

a first port for inputting and outputting optical signals;

a second port for inputting and outputting optical signals;

a first lens for collimating incoming signals from the first and second ports and for launching them along diverging third and fourth paths, respectively; and for receiving outgoing optical signals traveling along the third and fourth paths and focusing them onto the first and second ports, respectively;

first polarization dependent beam deflecting means optically coupled to said first lens for directing optical signals with a first polarization traveling between the third path and the first path, and for directing optical signals with a second orthogonal polarization between the fourth path and the second path.

BRIEF DESCRIPTION OF THE DRAWINGS

FIGS. 3a and 3b illustrate top and side views, respectively, of a three port, reciprocal interleaver according to the principles of the present invention;

FIGS. 5a and 5b illustrate top and side views, respectively, of a four port, reciprocal interleaver according to the principles of the present invention;

FIGS. 6a and 6b illustrate top and side views, respectively, of a four port, non-reciprocal interleaver according to the principles of the present invention;

FIGS. 7a and 7b illustrate a four port optical circulator according to the principles of the present invention.

DESCRIPTION OF THE PREFERRED EMBODIMENTS

Figure 1:
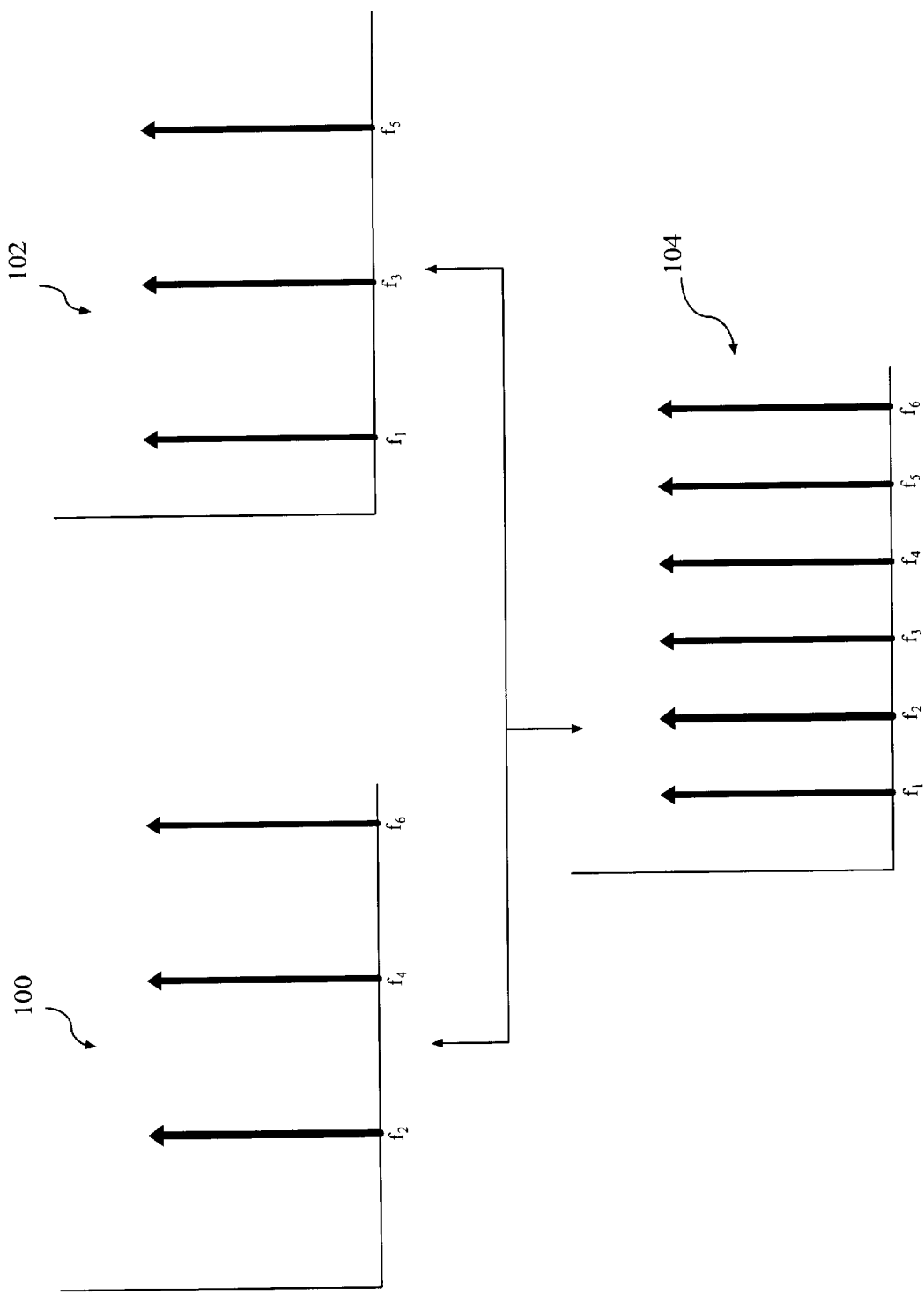
FIG. 1 conceptually illustrates the function of an interleaver.

While this invention is illustrated and described in one or more preferred embodiments, the device may be produced in many different configurations, forms and materials. There is depicted in the drawings, and will herein be described in detail, one or more preferred embodiments of the invention, with the understanding that the present disclosure is to be considered as an exemplification of the principles of the invention and the associated functional specifications for its construction and is not intended to limit the invention to any embodiments illustrated. Those skilled in the art will envision many other possible variations within the scope of the present invention.

Figure 2:
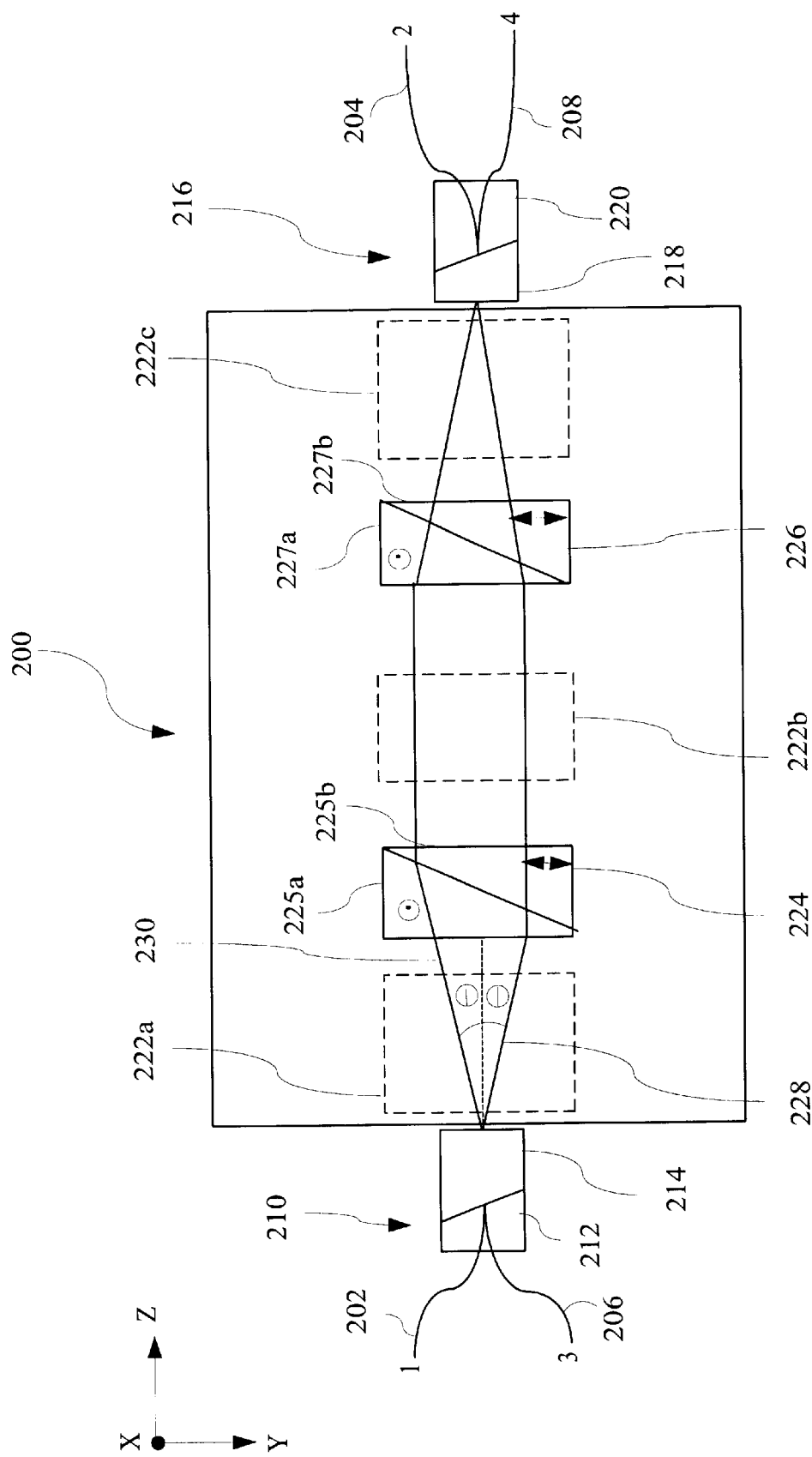
FIG. 2 illustrates a general four port optical device demonstrating the principles of the present invention.

FIG. 2 illustrates a general four port optical device 200 demonstrating the principles of the present invention. In the context of the present invention, a port refers to the optical waveguide, preferably optical fiber, for inputting or outputting optical beams, rather than the couplings 210, 216 for coupling the optical waveguides to the optical device 200. Therefore, in the context of the present invention, four port device 200 has four optical waveguides: a first to optical waveguide 202, designated as port 1; a second optical waveguide 204, designated as port 2; a third optical waveguide 206, designated as port 3; and a fourth optical waveguide 208, designated as port 4. Optical waveguides 202, 206 are coupled to optical device 200 preferably via a single coupling 210, which is a dual fiber collimator comprised of a double bore glass ferrule 212 and a graded index (GRIN) lens 214. Likewise, optical waveguides 204, 208 are coupled to optical device 200 preferably via a single coupling 216, which is a dual fiber collimator comprised of a double bore glass ferrule 220 and a GRIN lens 218. Optical beams input to device 200 via one of the four ports is collimated, i.e. the light rays are made substantially parallel by the corresponding GRIN lens, 214 or 218. Other appropriate collimating lenses, however, can be used.

A coordinate system as illustrated in FIG. 2 is designated to aid in the discussion of the operation of optical device 200.

Optical device 200 is comprised of various optical components 222a, 222b and 222c for operating on input optical beams, a first polarization dependent beam director 224 proximate to ports 1 and 3, and a second polarization dependent beam director 226 proximate to ports 2 and 4. Preferably, polarization dependent beam directors 224 and 226 are Wollaston prisms. A Wollaston prism comprises two orthogonal, typically calcite, birefringent prisms cemented together on their base. The fast optical axis of each of the prisms lie perpendicularly to each other and perpendicular to the direction of propagation of the incident light. By this arrangement, light polarized in the same direction as the fast optical axis of one of the prisms is deflected in a first direction at a first angle from the incident axis, while light polarized in the same direction as the fast optical axis of the other prism is deflected in a second direction at a second angle from the incident axis on the opposite side thereof. Polarization dependent beam directors 224 and 226 are used to direct at least two optical beams that propagate in substantially the same direction in optical device 200 into an appropriate port or along parallel paths. This is accomplished by, prior to the beams passing through beam director, polarizing one of the beams in the same direction as the fast optical axis of one of the prisms to deflect it in the first direction, while polarizing the second beam in the same direction as the fast optical axis of the other prism to deflect it in the direction opposite the first.

To illustrate, when an optical beam 230 is input to device 200 via port 1, it is injected at an angle θ with respect to the z axis in the −y direction. Similarly, when an optical beam is input to device 200 via port 3, it is injected at an angle θ with respect to the z axis in the y direction. This allows a single GRIN lens 214 to be used to collimate the beams and, consequentially, for ports 1 and 3 to be proximately located. Proximate to ports 1 and 3 is first polarization dependent beam director 224, comprised of two birefringent prisms, 225a and 225b, joined together such that, as illustrated, the fast optical axis of prism 225a is perpendicular to the plane of projection, while the fast optical axis of prism 225b is in the plane of projection. The birefringent prisms 225a and 225b are also joined such that their bases form a line sloping upwards from left to right. Because of the orientation of the fast optical axes and the slope of the bases, polarization dependent beam director 224 deflects beams polarized parallel to the fast optical axis of prism 225a in the y direction, while deflecting beams polarized parallel to the fast optical axis of prism 225b in the −y direction.

If optical beam 230 is not already polarized parallel to the fast optical axis of prism 225a prior to entering optical device 200, it is polarized in this direction by optical components 222a prior to passing through polarization dependent beam director 224. Therefore, polarization dependent beam director 224 deflects optical beam 230 by approximately θ in the y direction so that it is propagating substantially parallel to the length of optical device 200. Likewise, any optical beam 228 entering optical device 200 is polarized parallel to the fast optical axis of prism 225b prior to passing through polarization dependent beam director 224. Therefore, polarization dependent beam director 224 deflects optical beam 228 by approximately θ in the −y direction so that it is propagating substantially parallel to the length of optical device 200.

Proximate to ports 2 and 4 is second polarization dependent beam director 226, comprised of two birefringent prisms, 227a and 227b, formed in the same manner as beam director 224. Therefore, like polarization dependent beam director 224, beam director 226 deflects beams polarized parallel to the fast optical axis of prism 227a in the y direction, while deflecting beams polarized parallel to the fast optical axis of prism 227b in the −y direction.

As such, after passing through optical components 222b beam 230 is polarized parallel to the fast optical axis of prism 227a so that it is deflected at an angle θ in the y direction when it passes through polarization dependent beam director 226. This directs beam 230 towards port 4. Similarly, after passing through optical components 22b, light beam 228 is polarized parallel to the fast optical axis of prism 227b so that it is deflected at an angle θ in the −y direction when it passes through polarization dependent beam director 226. This directs beam 228 towards port 2.

Beam 230 then passes through optical components 222c and exits through port 4. Likewise, beam 228 then passes through optical components 222c and exits through port 2.

The use of polarization dependent beam director 224 allows more than one optical beam to be input by different optical waveguides without, however, the need to couple the waveguides to different lenses. Polarization dependent beam director 226 allows more than one optical beam to be output by different optical waveguides without, however, the need to couple the waveguides to more than one lens.

FIGS. 3a and 3b illustrate top and side views, respectively, of a three port, reciprocal interleaver 300 according to the principles of the present invention. An optical waveguide 302, preferably optical fiber (designated as port 1), is coupled to interleaver 300 by a single fiber collimator 308 comprising a glass ferrule 310 and a GRIN lens 312. Optical waveguides 304 and 306, also preferably optical fiber (designated as ports 2 and 3 respectively), are coupled to interleaver 300 preferably by a dual fiber collimator 314 comprising a double bore glass ferrule 316 and a GRIN lens 318. Interleaver 300 preferably operates on ITU even and odd channels. When operated as an interleaver, interleaver 300 interleaves even channels input to port 2 with odd channels input to port 3 and outputs the interleaved optical beam out port 1. When operated as a deinterleaver, interleaver 300 deinterleaves even and odd channels of a beam input via port 1, and outputs the even channels via port 2, while outputting the odd channels via port 3. Hence, interleaver 300 is reciprocal because even channels input to port 1 are output via port 2 and vice versa, while odd channels input to port 1 are output via port 3 and vice versa.

Figure 3C:
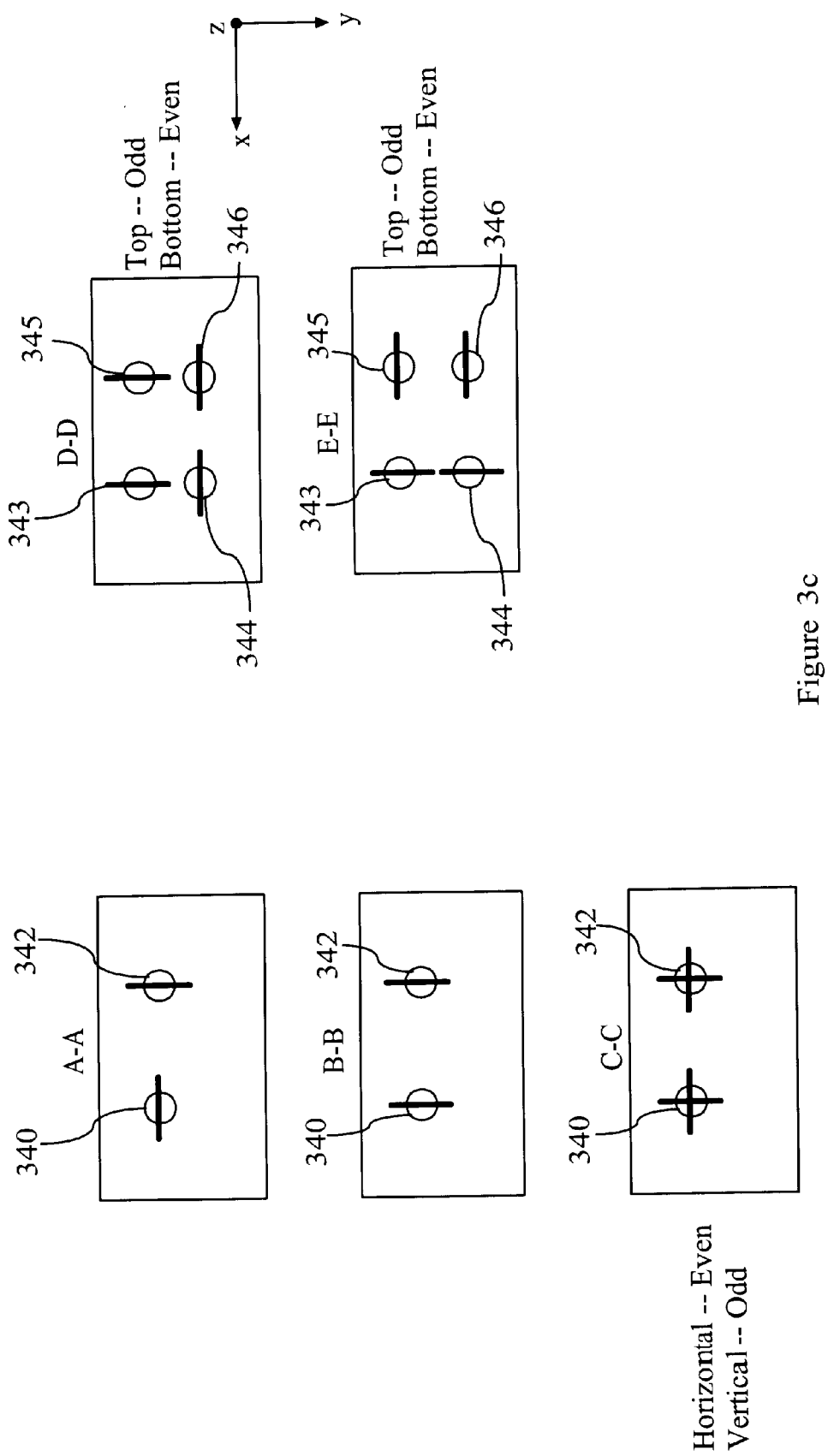
FIGS. 3c and 3d illustrate polarization state diagrams, looking down the +z axis and −z axis, respectively, of beams propagating through the three port, reciprocal interleaver of FIGS. 3a and 3b.

To aid in the discussion of the operation of interleaver 300, a coordinate system as illustrated in FIGS. 3a and 3b is designated. In addition, polarization of light parallel to the x to axis is designated as horizontal polarization, while polarization of light parallel to the y axis is designated as vertical polarization. These designations and conventions will apply to all descriptions of the various embodiments, unless noted otherwise. Further, the operation of interleaver 300 for light propagating in the +z direction is made with reference to FIGS. 3a and 3b in conjunction with FIG. 3c, which depicts cross sectional views along the z axis.

To perform interleaving and deinterleaving, interleaver 300 further comprises an x walk-off crystal 320, a wavelength polarization filter 322, a y walk-off crystal 326, a polarization dependent beam director 328, half-waveplates 330a, 330b and x walk-off crystal 332. An optical beam having even and odd channels enters interleaver 300 substantially parallel to the z axis via optical fiber 302 and single fiber collimator 308. This beam passes through x walk-off crystal 320 which divides this beam, in the x-z plane, into a first sub-beam 340 that is horizontally polarized and a second sub-beam 342 that is vertically polarized. Walk-off crystals typically consist of a birefringent material which allows components of the optical beam polarized in one direction to pass through normally because they are ordinary waves in the material, while components polarized orthogonally are extraordinary waves in the material and are consequently redirected at an angle due to the birefringent walk-off effect. The angle extraordinary waves are redirected is a well-known function of the particular birefringent material used. Examples of appropriate materials for a walk-off crystal are rutile, $YVO_4$ based crystals, calcite and lithium niobate. The length of walk-off crystal 320 is adjusted to obtain a spatial separation between the first and second beams that permits them to pass through some independent optical elements.

After exiting x walk-off crystal 320, the first sub-beam 340 passes through a half-wave plate 321 with its fast optical axis at an angle of 45° with respect to the polarization direction of beam 340. A half-waveplate is a reciprocal device made typically from birefringent material of a thickness such that the ordinary wave of a given wavelength of light is retarded during its passage through the half-waveplate by an integral number of half-wavelengths. This causes the ordinary wave to be 180° out of phase with the original ordinary wave, relative to the extraordinary wave. Therefore, a plane polarized wave entering a half-waveplate at an angle Φ to the fast optical axis of a half-waveplate is rotated by an angle 2Φ. Hence, half wave-plate 321 with a fast optical axis at an angle of 45° relative to the polarization of the first sub-beam 340 rotates first beam 340 by 90° to a vertical polarization. Other suitable materials for half-wave plates include, for example, mica, stretched polyvinyl alcohol, and quartz, cellophane, Mylar™, cellulose acetate, cellulose nitrate, sapphire, magnesium and fluoride.

After the first sub-beam 340 passes through half-waveplate 321, both the first sub-beam 340 and the second sub-beam 342 are vertically polarized and still contain both even and odd channels. Wavelength polarization filter 322 is preferably made from a plurality of birefringent plates whose material (e.g. $TiO_2$ crystals and $YVO_4$ crystals) and thicknesses are chosen to improve the thermal stability of filter 322 over a selected temperature range. These birefringent plates can be stacked at selected orientations or have waveplates positioned therebetween for reorienting the beams to operate on the wavelengths of the odd channels in first beam 340 and second beam 342 to cause a rotation of the even channels to a horizontal polarization. While described as a plurality of plates, other configurations however, are possible, such as a single birefringent plate if temperature stability is not of concern.

After the first sub-beam 340 and the second sub-beam 342 pass through wavelength polarization filter, they are composed of odd channels vertically polarized and even channels horizontally polarized which now pass through y walk-off crystal 326. Because the even channels are horizontally polarized, they are extraordinary waves in y walk-off crystal and, as such, are redirected in the y direction, while odd channels pass through normally because they are vertically polarized, i.e. ordinary rays in y walk-off 326. Hence, sub-beams 340 and 342 are split into sub-beams 344 and 346 containing the even channels and sub-beams 343 and 345 containing the odd channels.

These beams then pass through polarization dependent beam director 328, preferably a Wollaston prism, which deflects horizontally polarized beams in the y direction, while deflecting vertically polarized beams in the −y direction. The angles of deflection are such that the sub-beam 343 and sub-beam 345, containing odd channels, are guided towards port 3, while sub-beams 344 and 346, containing even channels, are guided towards port 2.

After passing through beam director 328, sub-beams 344 and 345 pass through half-wave plate 330a and 330b, respectively, rotating them by 90°. Sub-beams 343 and 345 thereafter are orthogonally polarized beams containing the odd channels, while sub-beams 344 and 346 are orthogonally polarized beams containing the even channels.

All of these beams then pass through an x walk-off crystal 332. The horizontally polarized beams 345 and 346 are ordinary waves through x walk-off 332 and, as such, are redirected so as to combine with vertically polarized beams 343 and 344, respectively. Therefore, the sub-beams 343 and 345, both directed towards port 3, become a single beam carrying the odd channels, which has vertical and horizontal components. This single beam is focused by GRIN lens 318 and exits interleaver 300 through port 3. Likewise, the sub-beams 344 and 346, both directed towards port 2, become a single beam carrying the even channels, which has vertical and horizontal components. This single beam is also focused by GRIN lens 318 and exits interleaver 300 through port 2.

Figure 3D:
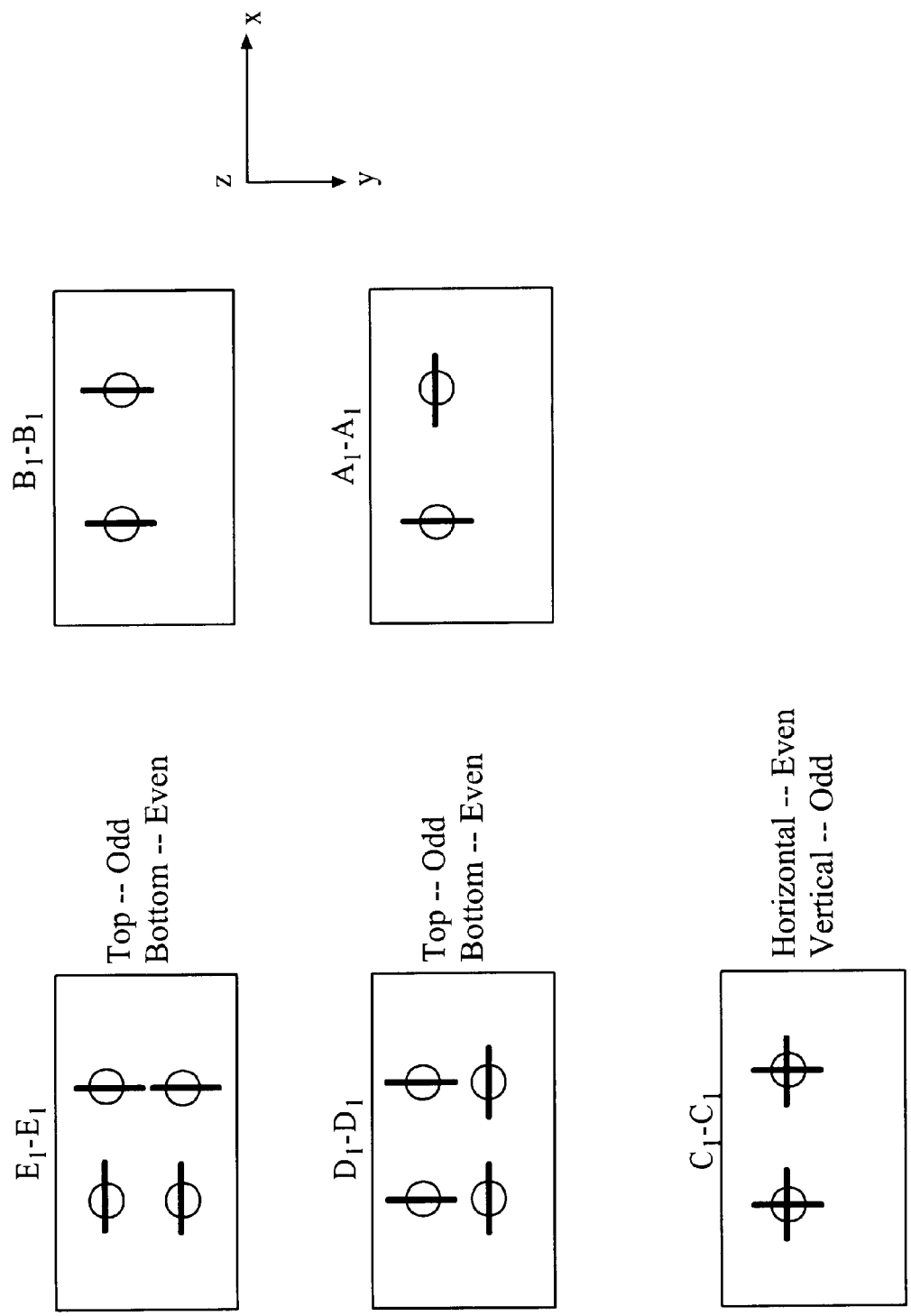

As illustrated in FIG. 3d, in conjunction with FIGS. 3a and 3b, operation of interleaver to interleave even channels input to port 2 and odd channels input to port 3 (i.e. for propagation of light in −z direction) is the reverse of the operation previously described.

Figures 4A, 4B:
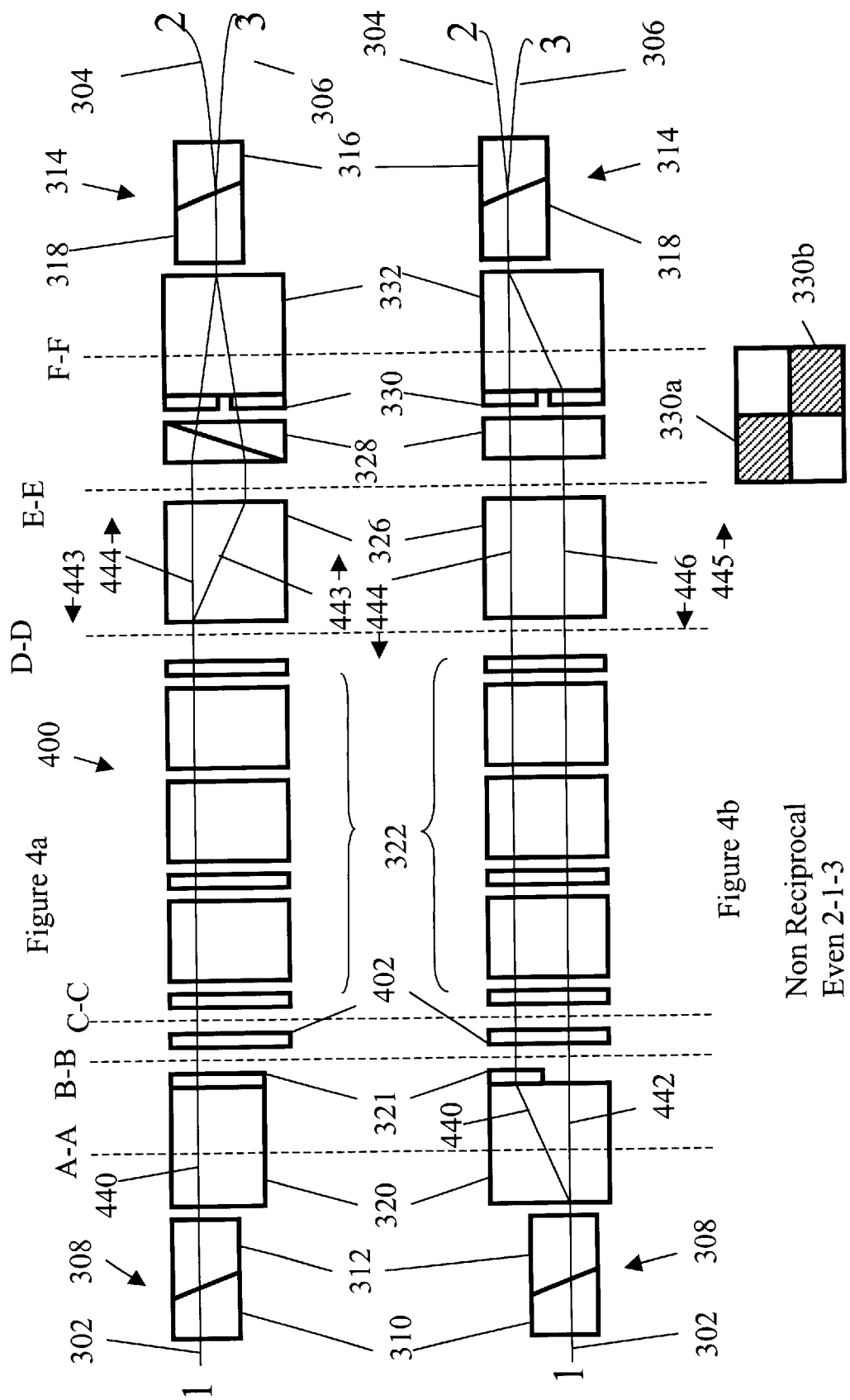
FIGS. 4a and 4b illustrate top and side views, respectively, of a three port, non-reciprocal interleaver according to the principles of the present invention.

FIGS. 4a and 4b illustrate top and side views, respectively, of a three port, nonreciprocal interleaver 400 according to the principles of the present invention. Nonreciprocal three-port interleaver 400 is similar to interleaver 300 shown in FIGS. 3a and 3b, with the addition of a non-reciprocal rotator 402, comprised of a Faraday rotator and half-wave plate, that rotates a beam passing there through by 0° or 90° depending upon the direction traveled. Faraday rotators typically include a transparent material, having a high Verdet constant, that is coupled to a magnet. The magnet produces a magnetic field having a component parallel to the direction of propagation of light within the Faraday rotator. This results in a beam's polarization being rotated in the same direction regardless of the direction of propagation. A half-waveplate, however, rotates the polarization of a beam in different directions depending upon the direction of propagation. Therefore, by coupling a Faraday rotator that rotates 45° and a half-waveplate that also rotates 45°, a non-reciprocal composite rotator is created that rotates a beam propagating in one direction by 0°, while rotating a beam propagating in the opposite direction by 90°.

Materials with high Verdet constants used in Faraday rotators include, for example, bismuth-terbium iron garnets, which are often used in Faraday rotators operating at wavelengths in the range 1.3 $\mu$m to 1.55 $\mu$m. Other materials are available for other wavelength ranges. Furthermore, other materials are available that do not require the use of an external magnet, for example bismuth-substituted rare-earth iron garnets.

Figure 4C:
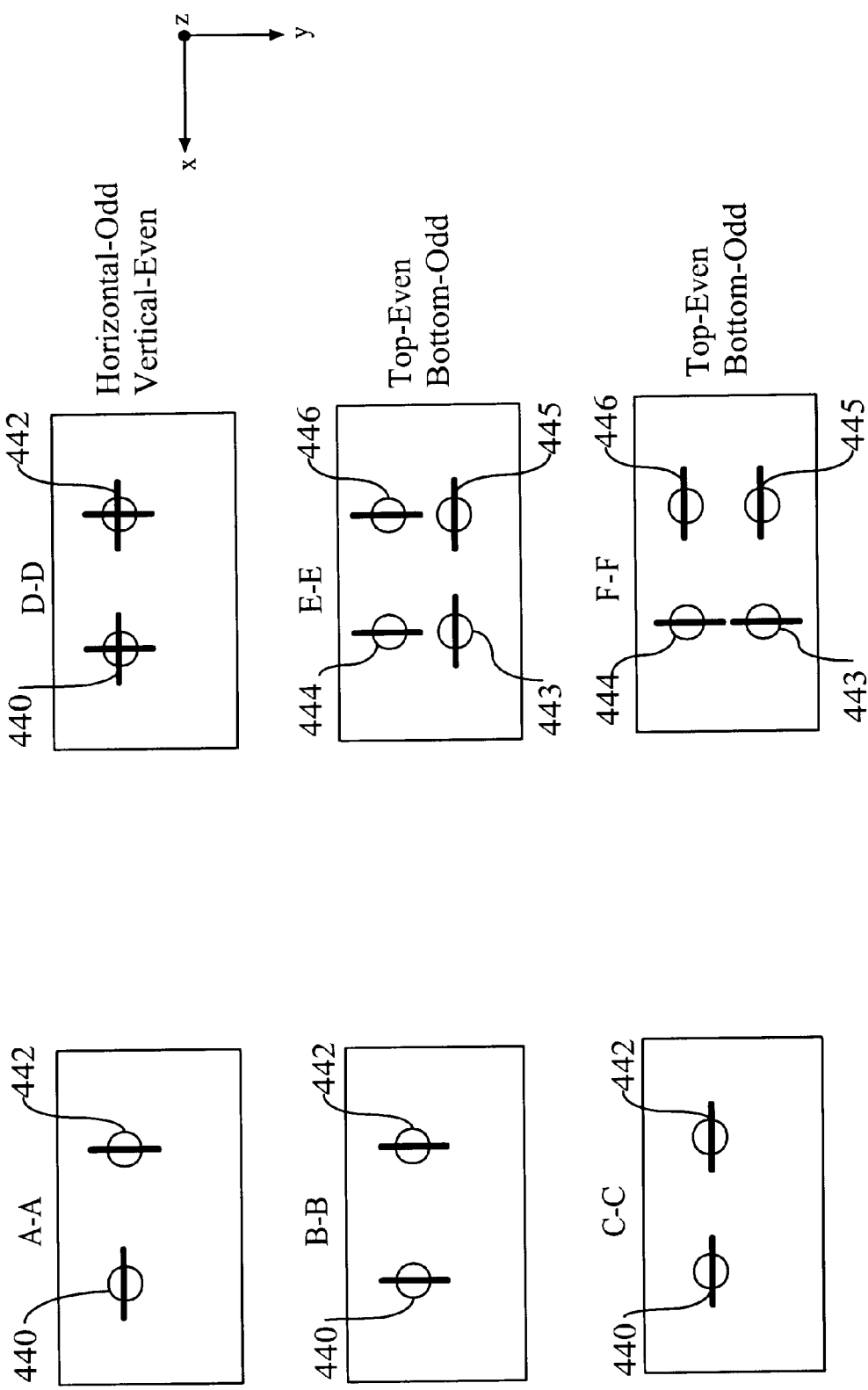
FIGS. 4c and 4d illustrate polarization state diagrams, looking down the +z axis and −z axis, respectively, of beams propagating through the three port, non-reciprocal interleaver of FIGS. 4a and 4b.
Figure 4D:
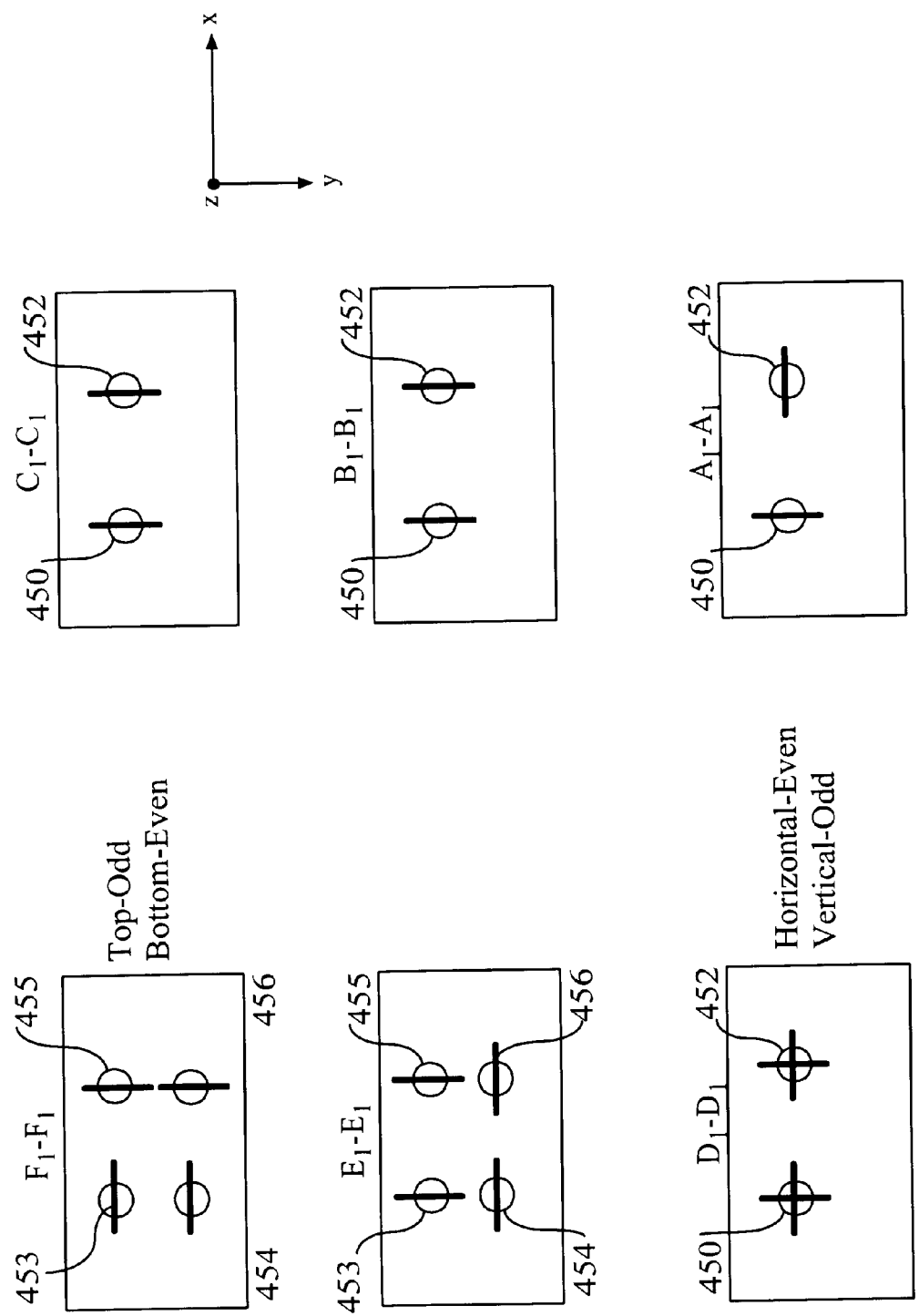

The non-reciprocal rotator 402 is situated such that beams are rotated by 0° when propagating in the −z direction, while rotating beams propagating in the +z direction by 90°. This results in an operation of interleaver 400 for beams propagating in the +z direction which is similar to interleaver 300 except, as illustrated in FIG. 4c, beams 440 and 442 are rotated to a horizontal polarization by non-reciprocal rotator 402 prior to passing through wavelength polarization filter 322. Therefore, the odd channels 443 and 445 remain horizontally polarized, while the even channels 444 and 446 become vertically polarized, after the beams 440 and 442 exit the wavelength polarization filter 322. With the even channels vertically polarized, they pass normally through the y walk-off crystal 326, while the odd channels walk off in the y direction because of their horizontal polarization. This results in the even channels exiting port 3 and the odd channels exiting port 2. As illustrated in FIG. 4d, operation of interleaver 400 for beams propagating in the −z direction is the same as interleaver 300, i.e. even channels travel from port 2 to port 1, while odd channels travel from port 3 to port 1.

FIGS. 5a and 5b illustrate top and side views, respectively, of a four port, reciprocal interleaver 500 according to the principles of the present invention. Optical waveguides 502 and 503, preferably optical fiber (designated as ports 1 and 2 respectively), are coupled to interleaver to 500 by a single fiber collimator 508 comprising a double bore glass ferrule 510 and a single GRIN lens 512. Likewise, optical waveguides 504 and 506 (designated as ports 3 and 4 respectively) are coupled to interleaver 500 by a dual fiber collimator 514 comprising a double bore glass ferrule 516 and a single GRIN lens 518.

Interleaver 500 preferably operates on ITU even and odd channels. When operated as an interleaver, interleaver 500 interleaves even channels input to port 1 with odd channels input to port 2, and outputs the interleaved optical beam out port 3. Conversely, interleaver 500 interleaves odd channels input to port 1 with even channels input to port 2 and outputs the interleaved optical beam out port 4. Similarly, interleaver 500 interleaves even channels input to port 3 with odd channels input to port 4 and outputs the interleaved optical beam out port 1, while, conversely, interleaving odd channels input to port 3 with even channels input to port 4 and outputting the interleaved optical beam out port 2.

When operated as a deinterleaver, interleaver 500 deinterleaves even and odd channels of a beam input via any of port 1, port 2, port 3 or port 4. For beams input via port 1, the even channels are output via port 3, while the odd channels are output via port 4. For beams input via port 2, the even channels are output via port 4, while the odd channels are output via port 3. For beams input via port 3, the even channels are output via port 1, while the odd channels are output via port 2. For beams input via port 4, the even channels are output via port 2, while the odd channels are output via port 1.

Figure 5C:
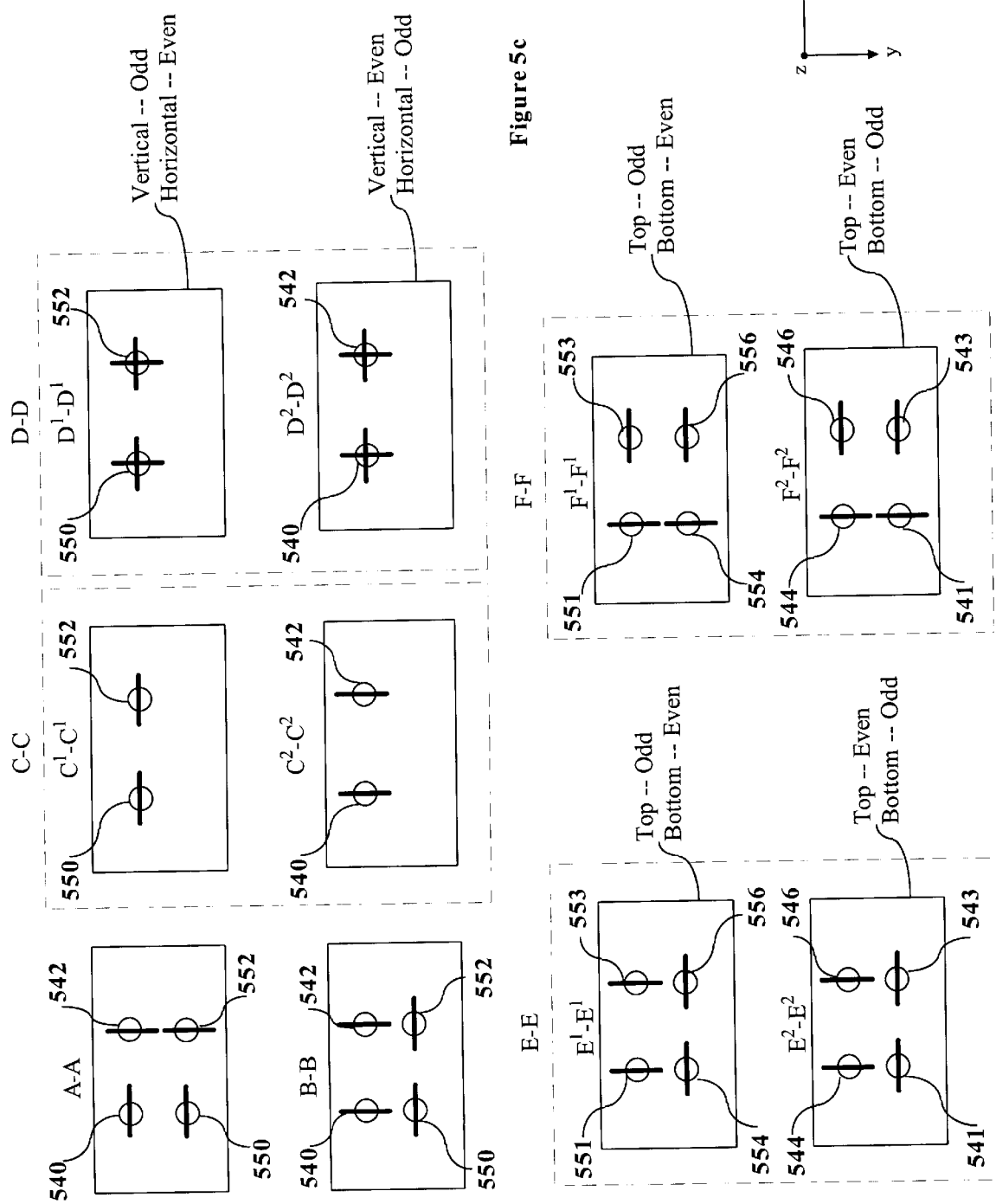
FIG. 5c illustrates polarization state diagrams, looking down the +z axis, of beams propagating through the four port, reciprocal interleaver of FIGS. 5a and 5b.

Further discussion of the operation of interleaver 500 for light propagating in the +z direction is made with reference to FIGS. 5a and 5b in conjunction with FIG. 5c, which depicts cross sectional views along the z axis. Further, operation of interleaver 500 is made with respect to operation of interleaver 500 as a de-interleaver, however, operation of interleaver 500 as an interleaver will be readily apparent to one of skill in the art from the following discussion.

When an optical beam 549 comprising even and odd channels is input via port 1, it is input at an angle θ with respect to the z axis in the y direction. Optical beam 549 is collimated by GRIN lens 512, which is also used to collimate any optical beams input via port 2. Optical beam 549 passes through x walk-off crystal 520 which divides optical beam 549, in the x-z plane, into a beam 550 that is horizontally polarized and a beam 552 that is vertically polarized (A—A). Beam 552 passes through a half-waveplate 521a that rotates it 90°. Beams 550 and 552 are now both horizontally polarized and continue following a path at an angle to the z axis (B—B). Beams 550 and 552 continue on this path until they pass through a polarization dependent beam director 523, preferably a Wollaston prism, which deflects vertically polarized beams in the −y direction by the angle θ, while deflecting horizontally polarized beams in the y direction by the angle θ. Therefore, beam 550 and beam 552 follow a path parallel to the z axis after passing through beam director 523.

These beams now pass through y walk-off crystal 525. Because beams 550 and 552 are horizontally polarized, they are extraordinary waves in y walk-off crystal and therefore are redirected in the y direction ($C^1$—$C^1$). Beams 550 and 552 then pass through wavelength polarization filter 522. Wavelength polarization filter 522 operates on the wavelengths of the odd channels in beams 550 and 552 to cause a rotation of the odd channels to a horizontal polarization ($D^1$—$D^1$).

After beams 550 and 552 pass through wavelength polarization filter 522, they are composed of odd channels vertically polarized and even channels horizontally polarized which now pass through y walk-off crystal 526. Because even channels are horizontally polarized they are extraordinary waves in y walk-off crystal and therefore are redirected in the y direction, while odd channels pass through normally because they are ordinary rays in y walk-off 526 ($E^1$—$E^1$). Hence, even channel sub-beams 554 and 556 are split from odd channel sub-beams 551 and 553.

These beams then pass through polarization dependent beam director 528, also preferably a Wollaston prism, which deflects horizontally polarized in the y direction by the angle θ, while deflecting vertically polarized beams in the −y direction by the angle θ. Therefore, sub-beams 551 and 553 containing odd channels are guided towards port 4, while sub-beams 554 and 556 containing even channels are guided towards port 3.

After passing through the beam director 528, the sub-beam 553 and the sub-beam 554 each pass through a half-wave plate 530a and 530b, respectively, rotating them by 90°. The sub-beams 551 and 553 thereafter are orthogonally polarized beams containing the odd channels, while the sub-beams 554 and 556 are orthogonally polarized containing the even channels ($F^1$—$F^1$).

All of these beams then pass through an x walk-off crystal 532. The horizontally polarized beams 553 and 556 are extraordinary waves through x walk-off 532 and, as such, are directed so as to combine with vertically polarized beams 551 and 554, respectively. Therefore, beams 551 and 553 directed towards port 4 become a single beam carrying the odd channels, which has vertical and horizontal components. This single beam is focused by GRIN lens 518 and exits interleaver 500 through port 4. Likewise, beams 554 and 556 directed towards port 3 become a single beam carrying the even channels, which has vertical and horizontal components. This single beam is focused by GRIN lens 518 and exits interleaver 500 through port 3.

In addition to a beam propagating in the +z direction comprising even and odd channels being input to port 1, a beam propagating in the +z direction comprising even and odd channels can be input via port 2. In this case, an optical beam 548 comprising even and odd channels is input via port 2 at an angle θ with respect to the z axis in the −y direction. Optical beam 548 is also collimated by GRIN lens 512. Inputting beams via port 1 and port 3 at an angle allows a single GRIN lens 512 to be used to collimate the input beams.

Like optical beam 549, optical beam 548 passes through x walk-off crystal 520, which divides optical beam 548, in the x-z plane, into a beam 540 that is horizontally polarized and a beam 542 that is vertically polarized (A—A). Beam 540 passes through a half-waveplate 521b that rotates it 90°. Beams 540 and 542 are now both vertically polarized and continue following a path at an angle to the z axis. Beams 540 and 542 continue on this path until they pass through polarization dependent beam director 523. Because beam director 523 deflects vertically polarized beams in the −y direction by θ, as previously described, beam 540 and beam 542 follow a path parallel to the centerline after passing through beam director 523 (B—B).

These beams now pass through y walk-off crystal 525. Because beams 540 and 542 are vertically polarized, they are ordinary waves in y walk-off crystal and therefore pass straight through ($C^2$—$C^2$). Beams 540 and 542 then pass through wavelength polarization filter 522. Wavelength polarization filter 522 operates on the wavelengths of the odd channels in beams 540 and 542 to cause a rotation of the odd channels to a horizontal polarization.

After beams 540 and 542 pass through wavelength polarization filter 522, they are composed of odd channels horizontally polarized and even channels vertically polarized ($D^2$—$D^2$) which now pass through y walk-off crystal 526. Because odd channels are horizontally polarized, and therefore extraordinary waves, they are redirected in the y direction. Even channels, on the other hand, pass through normally because they are ordinary waves due to their vertical polarization. Hence, odd channel sub-beams 541 and 543 are split from even channel sub-beams 544 and 546 ($E^2$—$E^2$).

These beams then pass through polarization dependent beam director 528. As previously described, beam director 528 deflects horizontally polarized in the y direction by the angle θ, while deflecting vertically polarized beams in the −y direction by the angle θ. Therefore, beams 544 and 546 containing even channels are guided towards port 4, while beams 541 and 543 containing odd channels are guided towards port 3.

After passing through the beam director 528, the sub-beams 541 and 546 each pass through a half-wave plate 521a and 521b, respectively, that rotates them by 90°. The sub-beams 544 and 546 thereafter are orthogonally polarized beams containing the even channels, while sub-beams 541 and 543 are orthogonally polarized containing the odd channels ($F^2$—$F^2$).

All of these beams then pass through an x walk-off crystal 532. The horizontally polarized beams 543 and 546 are extraordinary waves through x walk-off 532 and, as such, are directed so as to combine with vertically polarized beams 541 and 544, respectively. Therefore, beams 544 and 546 directed towards port 4 become a single beam carrying the even channels, which has vertical and horizontal components. The single beam is focused by GRIN lens 518 and exits the interleaver 500 through port 4. Likewise, beams 541 and 543 directed towards port 3 become a single beam carrying the odd channels, which has vertical and horizontal components. This single beam is focused by GRIN lens 518 and exits interleaver 500 through port 3.

As will be appreciated by one of skill in the art, operation of interleaver 500 for beams input via port 3 or port 4 is the same as beams input via port 1 or port 2; where operation for beams input via port 3 corresponds to beams input via port 1 and operation for beams input via port 4 corresponds to beams input via port 2.

FIGS. 6a and 6b illustrate top and side views, respectively, of a four port, non-reciprocal interleaver 600 according to the principles of the present invention. Non-reciprocal four port interleaver 600 is similar to interleaver 500 shown in FIGS. 5a and 5b, with the addition of a non-reciprocal rotator 600, comprising a Faraday rotator and half-wave plate, that rotates a beam passing there through by 0° or 90° depending on the direction traveled. The Faraday rotator and the half-waveplate create a non-reciprocal composite rotator that rotates beams propagating in the −z direction by 90°, while rotating beams propagating in the +z direction by 0°.

Figure 6C:
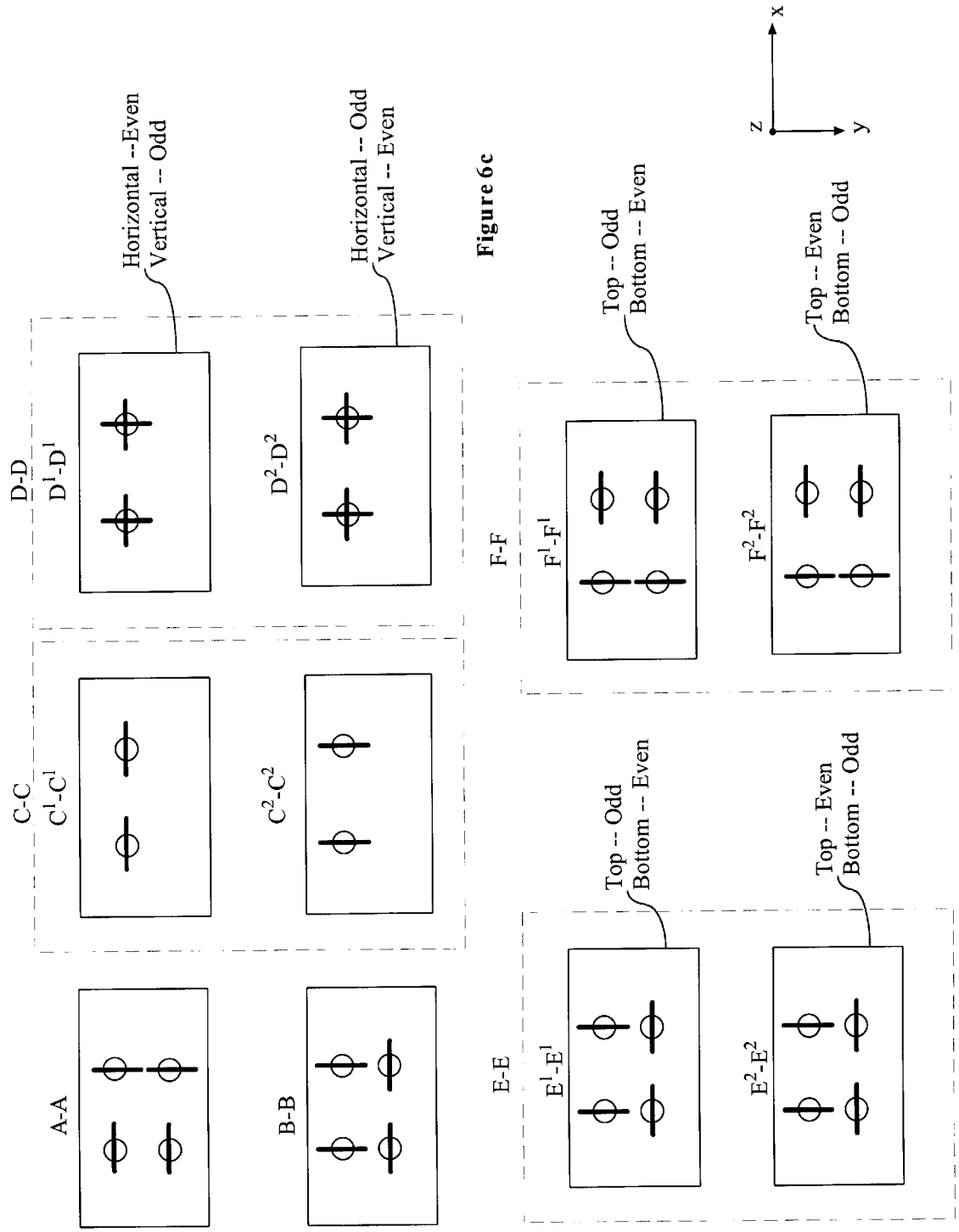
FIGS. 6c and 6d illustrate polarization state diagrams, looking down the +z axis and −z axis, respectively, of beams propagating through the four port, non-reciprocal interleaver of FIGS. 6a and 6b.
Figure 6D:
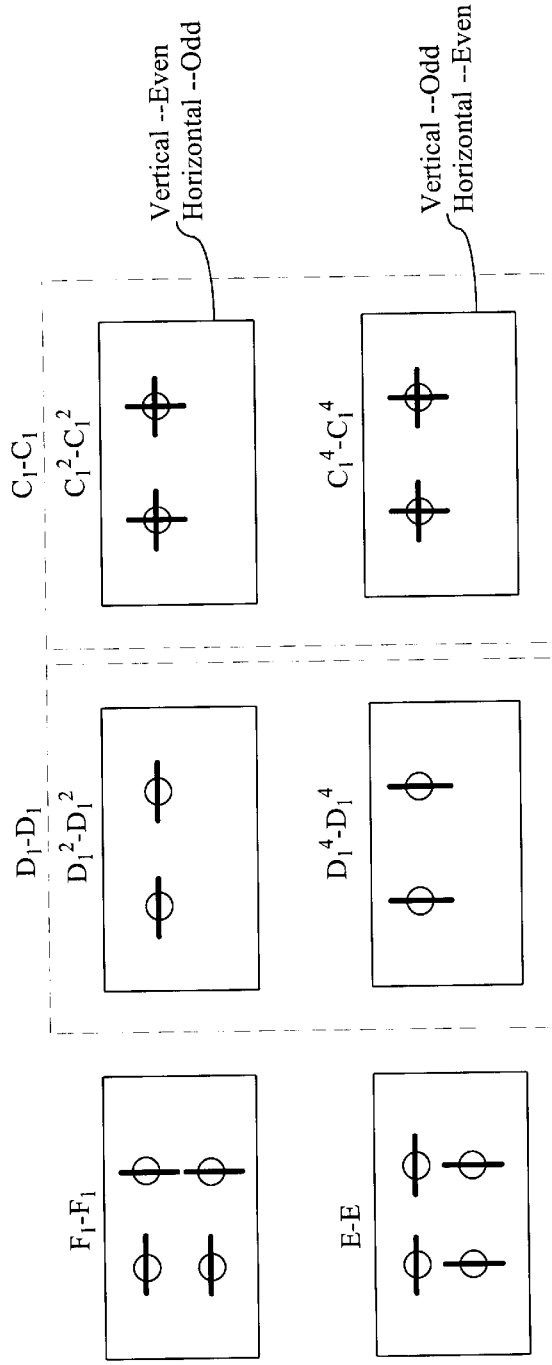
Figure 6D:
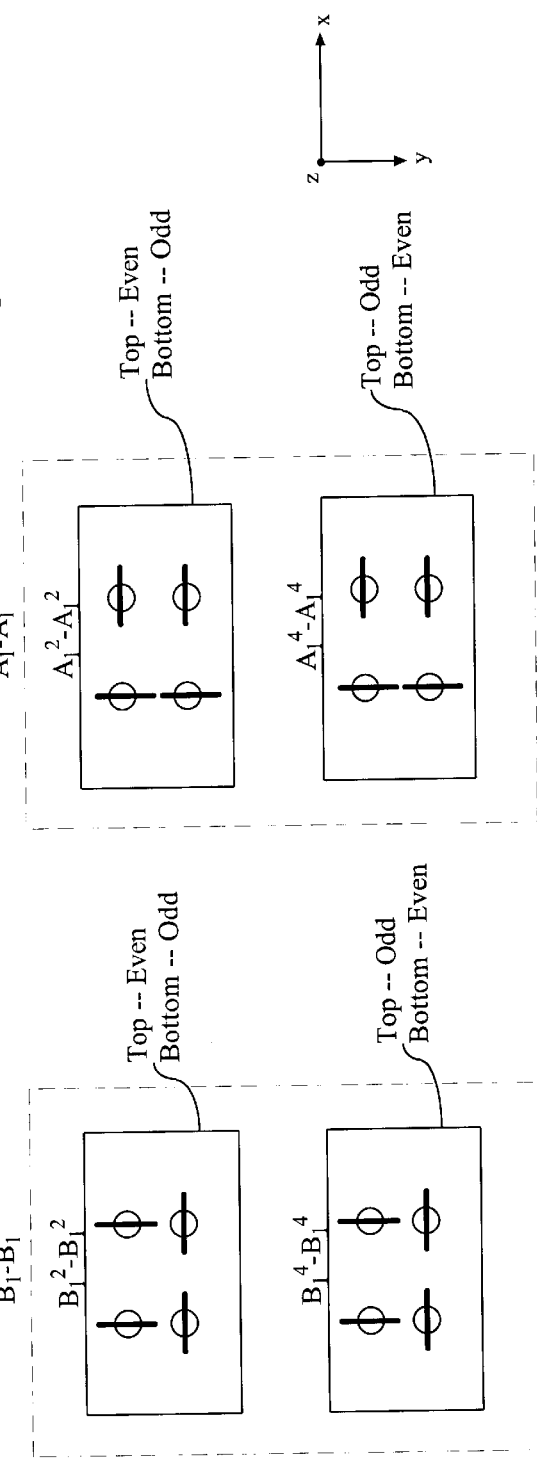

As illustrated in FIG. 6c, because the non-reciprocal rotator 600 rotates beams propagating in the +z direction by 00, operation of interleaver 600 is the same as the operation of interleaver 500 for beams propagating in the +z direction. As illustrated in FIG. 6d, operation of interleaver 600 for beams propagating in the −z direction is similar to interleaver 500, except that the 90° rotation by the non-reciprocal rotator 600 causes even channels input via port 3 to exit via port 2 and even channels input via port 4 to exit via port 1. This 90° rotation also causes odd channels input via port 3 to exit via port 1 and odd channels input via port 4 to exit via port 2.

Figure 7C:
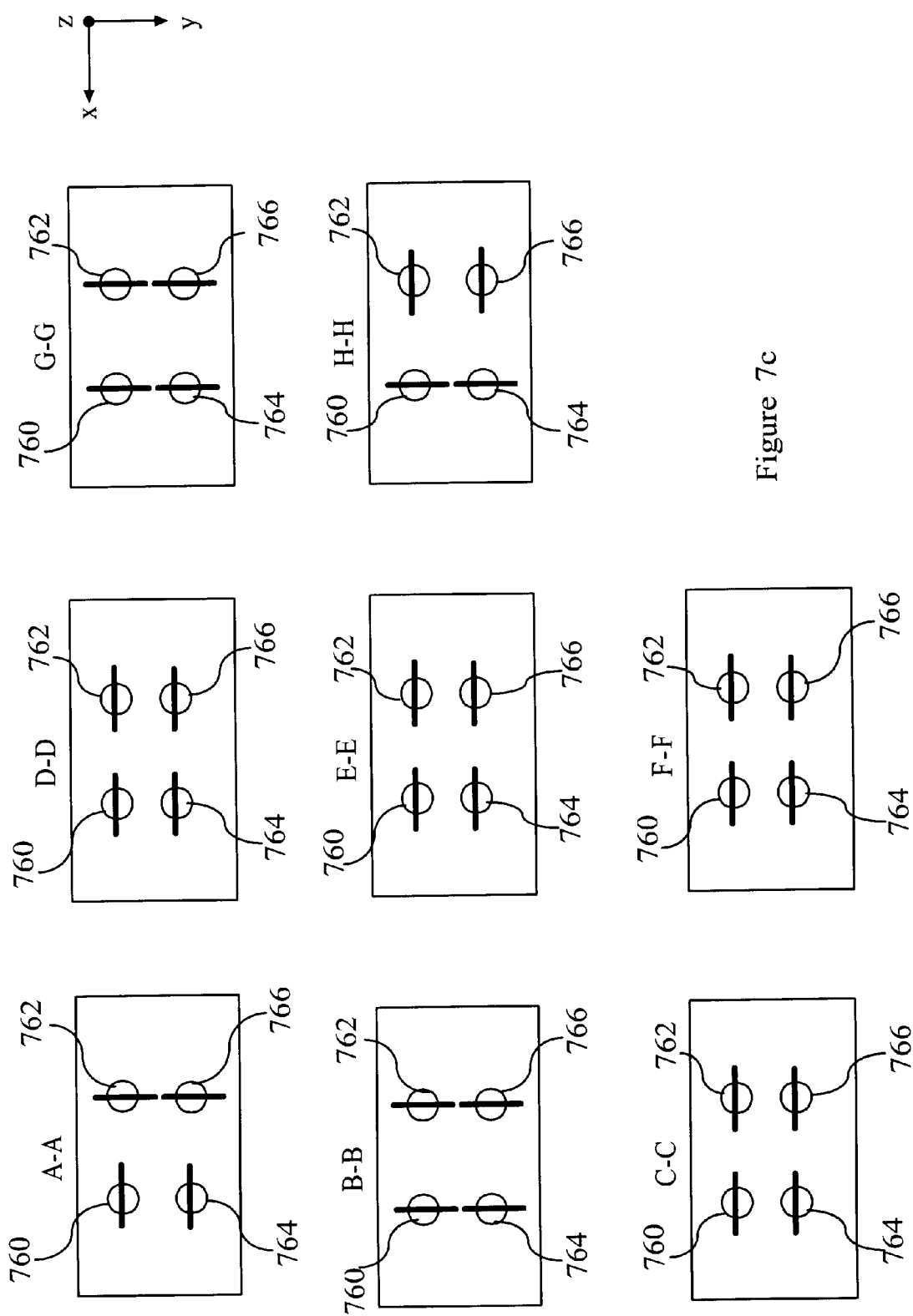
FIGS. 7c and 7d illustrate polarization state diagrams, looking down the +z axis and −z axis, respectively, of beams propagating through the four port circulator of FIGS. 7a and 7b.

FIGS. 7a and 7b illustrate a four port optical circulator 700 according to the principles of the present invention. Optical waveguides 702 and 704, preferably optical fiber (designated as ports 1 and 3 respectively), are coupled to circulator 700 by a dual fiber collimator 706 comprising a double bore glass ferrule 708 and a single GRIN lens 710. Likewise, optical waveguides 750 and 752 (designated as ports 2 and 4 respectively) are coupled to circulator 700 by a dual fiber collimator 748 comprising a double bore glass ferrule 746 and a single GRIN lens 742.

In general, an optical beam entering circulator 700 via port 1 exits circulator 700 via port 2, while an optical beam entering via port 2 exits via port 3. Also, an optical beam entering port 3 exits via port 4, while an optical beam entering port 4 is extinguished in circulator 700. A more detailed discussion of the operation of circulator for an optical beam entering port 1 or port 3 is made with reference to FIG. 7c, which depicts cross sectional views along the z axis in addition to FIGS. 7a and 7b.

Any optical beam 754 entering port 1 of circulator 700 enters at an angle θ with respect to the z axis in the y direction. Similarly, any optical beam 755 entering port 3 enters on at an angle θ with respect to the z axis in the −y direction. A single GRIN lens 710 is used to collimate both optical beams 754 and 755. Optical beam 754 passes through x walk-off crystal 712 which divides optical beam 754, in the x-z plane, into a beam 764 that is horizontally polarized and a To beam 766 that is vertically polarized. Likewise, x walk-off crystal 712 divides optical beam 755 in the x-z plane into a beam 760 that is horizontally polarized and a beam 762 that is vertically polarized. Beams 760 and 764 pass through a half-waveplate 714 that rotates them 90° to a vertical polarization.

Beams 760 and 762 are now both vertically polarized and continue following a path at an angle to the z axis. Beams 760 and 762 continue on this path until they pass through a halfwave-plate 716 and a polarization dependent beam director 718, preferably a Wollaston prism. Half-waveplate 716 rotates beams 760 and 762 to a horizontal polarization. Polarization dependent beam director 718 deflects horizontally polarized beams in the y direction by the angle θ. Therefore, after passing through beam director 718, beams 760 and 762 propagate parallel to the z axis.

Similarly, beams 764 and 766 are both vertically polarized and continue to follow a path at an angle to the z axis. These beams, however, do not pass through a half-waveplate and, consequently, enter beam director 718 vertically polarized. Beam director 718 deflects vertically polarized beams in the −y direction by the angle θ, which results in beams 764 and 766 also propagating parallel to the z axis after passing through beam director 718. After passing through beam director 718, beams 764 and 766 pass through a half-waveplate 720 which rotates them 90° to a horizontal polarization.

Beams 760 and 762 and beams 764 and 766 now pass through a composite non-reciprocal rotator comprising Faraday rotator 722 and a 45° half-waveplate 724. Faraday rotator 722 and half-waveplate 724 rotate beams propagating in a +z direction by 0°. Therefore, beams 760 and 762 and beams 764 and 766 remain horizontally polarized after passing through Faraday rotator 722 and half-waveplate 724.

Beams 760 and 762 and beams 764 and 766 then pass through a y walk-off crystal 726. These beams are ordinary waves in y walk-off crystal 726 due to their horizontal polarization and, therefore, pass through y walk-off crystal 726 normally. After passing through y walk-off crystal 726, these beams pass through another composite non-reciprocal rotator comprising a Faraday rotator 730 and a 45° half-waveplate 728. Faraday rotator 730 and a 45° half-waveplate 728 also rotate beams propagating in the +z direction by 0° which results in the beams remaining horizontally polarized.

Beams 760 and 762 are now both horizontally polarized and continue following a path parallel to the axis of circulator 700. Beams 760 and 762 continue on this path until they pass through a half-waveplate 732 and a polarization dependent beam director 734, also preferably a Wollaston prism. Half-waveplate 732 rotates beams 760 and 762 to a vertical polarization.

As illustrated, the fast optical axis of the first prism of beam director 734 that beams 760 and 762 traverse is perpendicular to the plane of projection, while the fast optical axis of the other prism is in the plane of projection. These prisms are joined such that their bases form a line sloping downwards from left to right. Because of the orientation of the fast optical axes and the slope of the bases, polarization dependent beam director 734 deflects vertically polarized beams in the y direction by the angle θ, while deflecting horizontally polarized beams in the −y direction by the angle θ. Therefore, beams 760 and 762, which originated from port 3, are directed towards port 4 after passing through beam director 734.

Similarly, beams 764 and 766 are both horizontally polarized and continue to follow a path parallel to the centerline. These beams, however, do not pass through a half-waveplate and, consequently, enter beam director 734 horizontally polarized. As described, beam director 734 deflects horizontally polarized beams in the −y direction by the angle θ, which results in beams 764 and 766, which originated from port 1, being directed towards port 2. After passing through beam director 734, beams 764 and 766 pass through a half-waveplate 736 which rotates them 90° to a vertical polarization.

Beams 762 and 766 next pass through a half-waveplate 738 which rotates them to a horizontal polarization. Beams 760 and 762 and beams 764 and 766 then pass through an x walk-off crystal 740. The horizontally polarized beams 762 and 766 are extraordinary waves through x walk-off 740 and, as such, are redirected so as to combine with vertically polarized beams 760 and 764. Therefore, beams 760 and 762 become a single beam which is focused by GRIN lens 742 and exits circulator 700 through port 4. Likewise, beams 764 and 766 become a single beam, which is focused by GRIN lens 742 and exits circulator 700 through port 2.

Figure 7D:
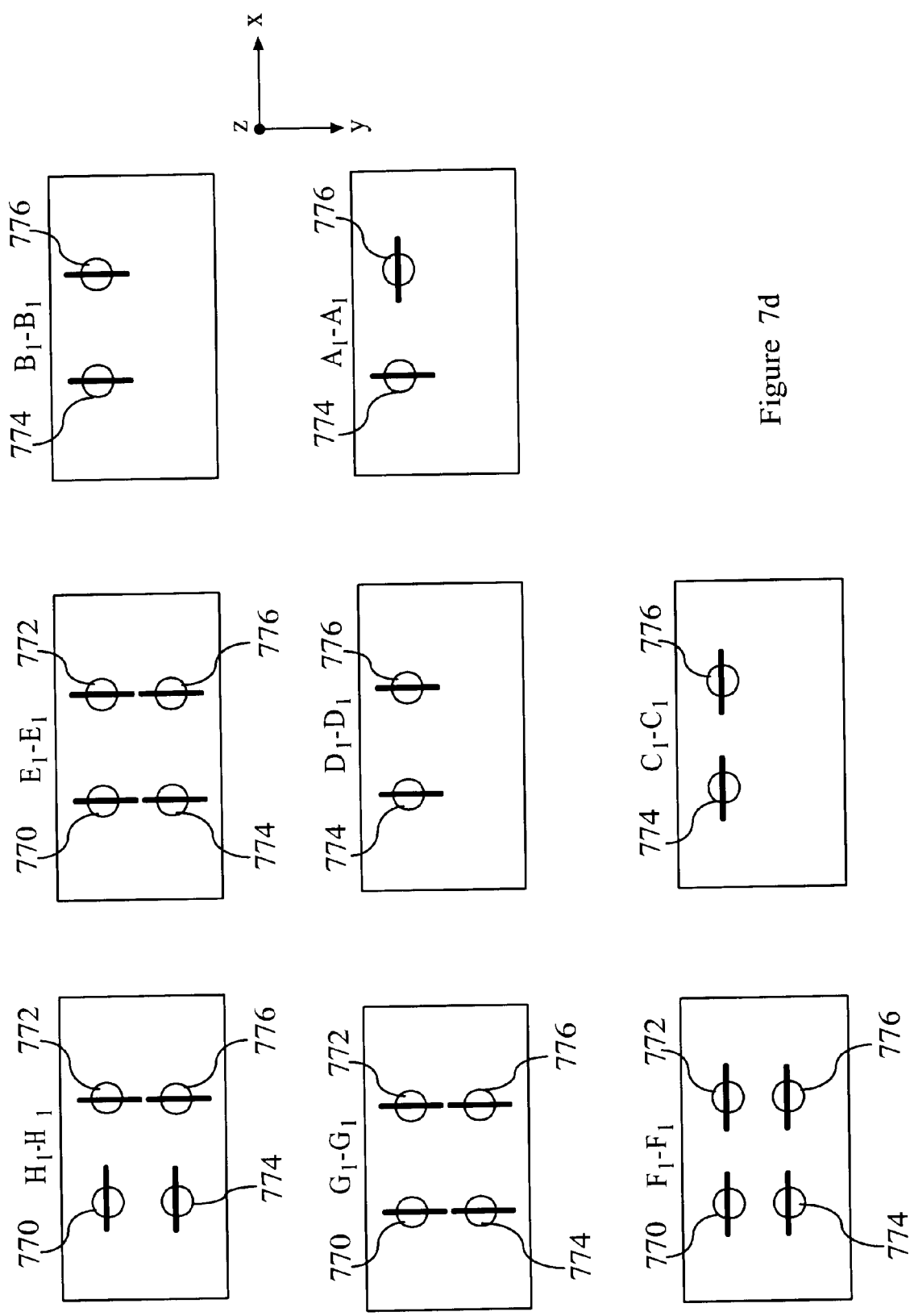

A more detailed discussion of the operation of circulator for an optical beam entering port 2 or port 4 is now made with reference to FIG. 7d, which depicts cross sectional views along the z axis, in addition to FIGS. 7a and 7b.

Any optical beam 756 entering port 2 of circulator 700 enters at an angle θ with respect to the z axis in the y direction, similar to an optical beam 754 entering port 1. Likewise, any optical beam 757 entering port 4 enters at an angle θ with respect to the z axis in the −y direction, similar to an optical beam 755 entering port 3. A single GRIN lens 742 is used to collimate both optical beams 756 and 757. Optical beam 756 passes through x walk-off crystal 740 which divides optical beam 756, in the x-z plane, into a beam 774 that is horizontally polarized and a beam 776 that is vertically polarized. Likewise, x walk-off crystal 740 divides optical beam 757 in the x-z plane into a beam 770 that is horizontally polarized and a beam 772 that is vertically polarized ($H_1$—$H_1$). Beams 770 and 774 pass through the half-waveplate 738 that rotates them 90° to a vertical polarization. Beams 774 and 776 are now both vertically polarized and continue following a path at an angle to the centerline of circulator 700 ($G_1$—$G_1$). Beams 774 and 776 continue on this path until they pass through half-waveplate 736 and polarization dependent beam director 734. Half-waveplate 736 rotates beams 774 and 776 to a horizontal polarization. As described previously, polarization dependent beam director 734 deflects horizontally polarized beams in the −y direction by an angle θ. Therefore, after passing through beam director 734, beams 774 and 776 propagate parallel to the z axis.

Similarly, beams 770 and 772 are both vertically polarized and continue to follow a path at an angle to the centerline.

These beams, however, do not pass through a half-waveplate and, consequently, enter beam director 736 vertically polarized. Also as described previously, beam director 736 deflects vertically polarized beams in the y direction by an angle θ. This results in beams 770 and 772 also propagating parallel to the z axis after passing through beam director 736. After passing through beam director 736, beams 770 and 772 pass through a half-waveplate 732 which rotates them 90° to a horizontal polarization ($F_1$—$F_1$).

Beams 770 and 772 and beams 774 and 776 now pass through Faraday rotator 730 and 45° half-waveplate 728. Faraday rotator 730 and half-waveplate 728 rotate beams propagating in a −z direction by 90°. Therefore, beams 770 and 772 and beams 774 and 776 are rotated to a vertical polarization after passing through Faraday rotator 730 and half-waveplate 728 ($E_1$—$E_1$).

Beams 770 and 772 and beams 774 and 776 then pass through y walk-off crystal 726. These beams are extraordinary waves in y walk-off crystal 726 due to their vertical polarization and, therefore, walk-off when passing through y walk-off crystal 726. This results in beams 774 and 776 walking off in the −y direction and exiting y walk-off crystal 726 along the optical path previously being traversed by beams 770 and 772. Beams 770 and 772 also walk-off in the −y direction, which results in them being extinguished ($D_1$—$D_1$). After passing through y walk-off crystal 726, beams 774 and 776 pass through Faraday rotator 722 and a 45° half-waveplate 724. Faraday rotator 722 and a 45° half-waveplate 724 also rotate beams propagating in the −z direction by 90°. Faraday rotator 722 and half-waveplate 724, therefore, rotate beams 774 and 776 to a horizontal polarization ($C_1$—$C_1$).

Beams 774 and 776 are both horizontally polarized and continue to follow a path parallel to the z axis. These beams enter beam director 718 horizontally polarized. Beam director 718 deflects horizontally polarized beams in the y direction by an angle θ, which results in beams 774 and 776, which originated from port 2, being directed towards port 3. After passing through beam director 718, beams 774 and 776 pass through a half-waveplate 716 which rotates them 90° to a vertical polarization ($B_1$—$B_1$).

Beam 776 next passes through half-waveplate 714, which rotates it to a horizontal polarization ($A_1$—$A_1$). Beams 774 and 776 then pass through x walk-off crystal 712. Horizontally polarized beam 776 is an extraordinary wave through x walk-off 712 and, as such, is redirected so as to combine with vertically polarized beam 774. Therefore, beams 774 and 776 combine into a single beam, which is focused by GRIN lens 710 and exits circulator 700 through port 3.

While various specific embodiments of the present invention have been shown and described, it will be apparent to one of skill in the art that various modifications and alternate constructions are possible without departing from the spirit and scope of the invention. For example, the polarizations of the beams may vary from those shown and described in the above embodiments without departing from the scope of the present invention. If the polarizations are different, the optical axes of the optical components can be adjusted accordingly. For the preferred polarization dependent beam director, the direction of the slope of the line formed by the interface of the prisms can also be adjusted according to the polarization and needed direction of deflection of beams passing through it.

Likewise, the angle and direction of the slope of the line formed by the interface of the prisms can also be adjusted according to the desired angle of deflection. While the angles of the injected optical beams and angle of deflection by the beam director have all been described as equal, other variations are conceived within the spirit of the invention. The angle of injection for beams from two optical waveguides coupled to the same collimating lens typically will only be the same when the two optical waveguides are placed symmetrical with respect to the center of the lens. The angle of deflection can also be affected by adjusting the angle of incidence of a beam on the preferred beam director. This can be accomplished by sloping the incident surface with respect to the direction of the beam propagation, rather than maintaining it perpendicular. Lastly, the exact birefringent material chosen for the prisms can affect the angle and direction of deflection, depending upon the birefringent materials index of refraction for ordinary and extraordinary waves. One of skill in the art will be able to appropriately design the needed parameters of the preferred beam director using well-known principles of optics, such as Snell's law.

In addition, the wavelength polarization filter in the various interleaver embodiments has been described as operating on ITU even channels. Other subsets, however, are envisioned as the principles of the interleaver remain unchanged so long as the wavelength polarization filter operates on some subset of an overall set of wavelengths. For instance, if the wavelength polarization filter in the three port reciprocal interleaver operates on ITU odd channels, then by re-designating port 2 as port 3 and vice versa, the same operation of even channels flowing between ports 1 and 2 and odd channels flowing between port 1 to port 3 results. Similarly, if the wavelength polarization filter in the three port reciprocal interleaver operates on ITU odd channels, the same operation of even channels flowing between ports 1 and 2 and odd channels flowing between port 1 to port 3 results. In either of these cases, a first subset of wavelengths flows between a first port and a second port, while a different subset of wavelengths flows between the first port and a third port.

What is claimed is:

1. An optical component for directing signals between a first port and a first path, and for directing signals between a second port and a second path, wherein the first and second paths are parallel, and wherein the first and second ports are positioned between said first and second paths, the optical component comprising:

a first port for inputting and/or outputting optical signals;

a second port for inputting and/or outputting optical signals;

a first lens for collimating incoming signals from the first and second ports and for launching them along diverging third and fourth paths, respectively; and/or for receiving outgoing optical signals traveling along the third and fourth paths and focusing them onto the first and second ports, respectively;

first polarization dependent beam deflecting means optically coupled to said first lens for directing optical signals with a first polarization traveling between the third path and the first path, and/or for directing optical signals with a second orthogonal polarization between the fourth path and the second path;

a third port for inputting and/or outputting optical signals;

a fourth port for inputting and/or outputting optical signals;

a second lens for collimating incoming signals from the third and fourth ports and for launching them along diverging fifth and sixth paths, respectively; and/or for receiving outgoing optical signals traveling along the fifth and sixth paths and focusing them onto the third and fourth ports, respectively;

second polarization dependent beam deflecting means optically coupled to said second lens for directing optical signals with a first polarization between the fifth path and a seventh path, and for redirecting optical signals with a second orthogonal polarization between the sixth path and an eighth path;

a wavelength selective polarization rotator for rotating the polarization of wavelength channels from a first set of wavelength channels, while having no cumulative effect on the polarization of wavelength channels from a second set of wavelength channels, which is independent of the first set of wavelength channels;

a first beam director optically coupled between the first polarization dependent beam deflecting means and the wavelength selective polarization rotator for directing the signals from the first and second ports to travel along the same path through the wavelength selective polarization rotator, and/or for separating the signals exiting the wavelength selective polarization rotating means into orthogonally polarized signals traveling along the first and second paths; and a second beam director optically coupled between the second polarization dependent beam deflecting means and the wavelength selective polarization rotator for directing the signals from the third and fourth ports to travel along the same path through the wavelength selective polarization rotator, and/or for separating the signals exiting the wavelength selective polarization rotating means into orthogonally polarized signals traveling along the seventh and eighth paths;

whereby an optical signal comprising at least one wavelength channel from the first set of wavelength channels travels from the first port to the fourth port and from the second port to the third port, while an optical signal comprising at least one wavelength channel from the second set of wavelength channels travels from the second port to the fourth port from the first port to the third port.

2. The component according to claim 1, further comprising:

beam splitting means optically coupled between the first polarization dependent beam deflecting means and the first lens for dividing the optical signals from the first and second ports into respective first and second orthogonally polarized sub-beams; and first polarization rotating means for rotating the polarization of at least one of the first and second sub-beams from the first port, whereby both the first and the second sub-beams from the first port have the first polarization; and second polarization rotating means for rotating the polarization of at least one of the first and second sub-beams from the second port, whereby both the first and the second sub-beams from the second port have the second polarization.

3. The component according to claim 1, further comprising:

non-reciprocal polarization rotating means for rotating the polarization of signals traveling through the component in a first direction, while having no cumulative effect on the polarization of optical signals traveling through the component in the opposite direction;

whereby optical signals comprising at least one wavelength channel from the first set of wavelength channels travel from the first port to the fourth port, from the fourth port to the second port, from the second port to the third port and from the third port to the first port; and whereby optical signals comprising at least one wavelength channel from the second set of wavelength channels travel from the second port to the fourth port, from the fourth port to the first port, from the first port to the third port and from the third port to the second port.

4. The component according to claim 3, wherein the wavelength selective polarization rotator comprises a birefringent crystal interleaver assembly.

5. The component according to claim 3, wherein the first polarization dependent beam deflecting means comprises a Wollaston prism.

6. The component according to claim 5, wherein the second polarization dependent beam deflecting means comprises a Wollaston prism.

7. The component according to claim 3, wherein the non-reciprocal polarization rotating means includes a Faraday rotator disposed between the wavelength selective polarization rotator and one of the first and second beam directors.

8. The component according to claim 1, wherein the wavelength selective polarization rotator comprises a birefringent crystal interleaver assembly.

9. The component according to claim 1, wherein the second polarization dependent beam deflecting means comprises a Wollaston prism.

10. The component according to claim 9, wherein the first polarization dependent beam deflecting means comprises a Wollaston prism.

* * * * *